US010888860B2

(12) United States Patent
Meixner et al.

(10) Patent No.: US 10,888,860 B2
(45) Date of Patent: Jan. 12, 2021

(54) SAMPLE TRANSFER DEVICE AND METHOD FOR SAMPLE TRANSFER

(71) Applicant: Hoffmann-La Roche, Inc., Little Falls, NJ (US)

(72) Inventors: Jens Meixner, Aalen (DE); Kevin Jooss, Aalen (DE); Christian Neusuess, Aalen (DE)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 73 days.

(21) Appl. No.: 16/123,227

(22) Filed: Sep. 6, 2018

(65) Prior Publication Data

US 2019/0001329 A1 Jan. 3, 2019

Related U.S. Application Data

(63) Continuation of application No. PCT/EP2017/055399, filed on Mar. 8, 2017.

(30) Foreign Application Priority Data

Mar. 8, 2016 (EP) .................................... 16159128

(51) Int. Cl.
*B01L 3/00* (2006.01)
*B01L 3/02* (2006.01)
(Continued)

(52) U.S. Cl.
CPC ....... *B01L 3/502707* (2013.01); *B01L 3/0293* (2013.01); *B01L 3/502715* (2013.01);
(Continued)

(58) Field of Classification Search
CPC .......... B01L 2200/027; B01L 2200/12; B01L 2300/04; B01L 2300/0816;
(Continued)

(56) References Cited

U.S. PATENT DOCUMENTS 6,632,404 B1 * 10/2003 Freitag .................... B01L 3/567
137/247
7,189,370 B2 3/2007 Liu
(Continued)

FOREIGN PATENT DOCUMENTS

CN 105229469 A 1/2016
EP 2 270 490 A1 1/2011
(Continued)

OTHER PUBLICATIONS

Rocklin et al., A Microfabricated Fluidic Device for Performing Two-Dimensional Liquid-Phase Separations, Anal Chem. 2000, 72, pp. 5244-5249.
(Continued)

*Primary Examiner* — Jennifer Wecker
(74) *Attorney, Agent, or Firm* — Bose McKinney & Evans LLP

(57) ABSTRACT

A sample transfer device, an analytical system for analyzing a sample, a method for sample transfer and a method for manufacturing the sample transfer device are disclosed. The sample transfer device includes at least one first block and at least one second block, wherein the first block has at least one first port and at least one second port, wherein the second block has at least one third port and at least one fourth port. The sample transfer device also has at least one slider. The slider is located between the first block and the second block and is configured to slide from a first position to a second position and vice versa. Both in the first position and in the second position a first straight channel is formed between the first port and the third port and a second straight channel is formed between the second port and the fourth port.

14 Claims, 10 Drawing Sheets

(51) Int. Cl.
*G01N 27/447* (2006.01)
*G01N 30/20* (2006.01)

(52) U.S. Cl.
CPC .. *B01L 3/502738* (2013.01); *G01N 27/44743* (2013.01); *G01N 27/44773* (2013.01); *G01N 27/44791* (2013.01); *B01L 2200/027* (2013.01); *B01L 2200/12* (2013.01); *B01L 2300/04* (2013.01); *B01L 2300/0816* (2013.01); *B01L 2300/0864* (2013.01); *B01L 2400/0415* (2013.01); *B01L 2400/0421* (2013.01); *B01L 2400/065* (2013.01); *G01N 27/44782* (2013.01); *G01N 2030/204* (2013.01)

(58) Field of Classification Search
CPC ..... B01L 2300/0864; B01L 2400/0415; B01L 2400/0421; B01L 2400/065; B01L 3/0293; B01L 3/502707; B01L 3/502715; B01L 3/502738; G01N 2030/204; G01N 27/44743; G01N 27/44773; G01N 27/44782; G01N 27/44791
See application file for complete search history.

(56) References Cited

U.S. PATENT DOCUMENTS

| | | | |
|---|---|---|---|
| 2002/0155032 A1* | 10/2002 | Liu | B01D 61/56 422/503 |
| 2008/0206102 A1 | 8/2008 | Liu | |
| 2010/0327577 A1* | 12/2010 | Funke | F16K 11/0655 285/332 |
| 2014/0093424 A1* | 4/2014 | Asahara | G01N 35/1081 422/65 |
| 2016/0082434 A1 | 3/2016 | Hiller et al. | |

FOREIGN PATENT DOCUMENTS

| | | |
|---|---|---|
| WO | WO 02/064253 A2 | 8/2002 |
| WO | WO 2014/182844 A1 | 11/2014 |

OTHER PUBLICATIONS

Gottschlich et al., Two-Dimensional Electrochromatography/Capillary Electrophoresis on a Microchip, Anal Chem. 2001, 73, pp. 2669-2674.

Lu et al., A Chip-Capillary Hybrid Device for Automated Transfer of Sample Pre-Separated by Capillary Isoelectric Focusing to Parallel Capillary Gel Electrophoresis for Two-Dimensional Protein Separation, Anal Chem. Aug. 21, 2012, 84, pp. 7001-7007.

Wang et al., Performing Isoelectric Focusing and Simultaneous Fractionation of Proteins on a Rotary Valve, Anal Chem., Jul. 16, 2013, 85, pp. 6603-6607.

International Preliminary Report on Patentability and Written Opinion of the International Searching Authority, PCT/EP2017/055399, dated Sep. 11, 2018, 7 pages.

* cited by examiner

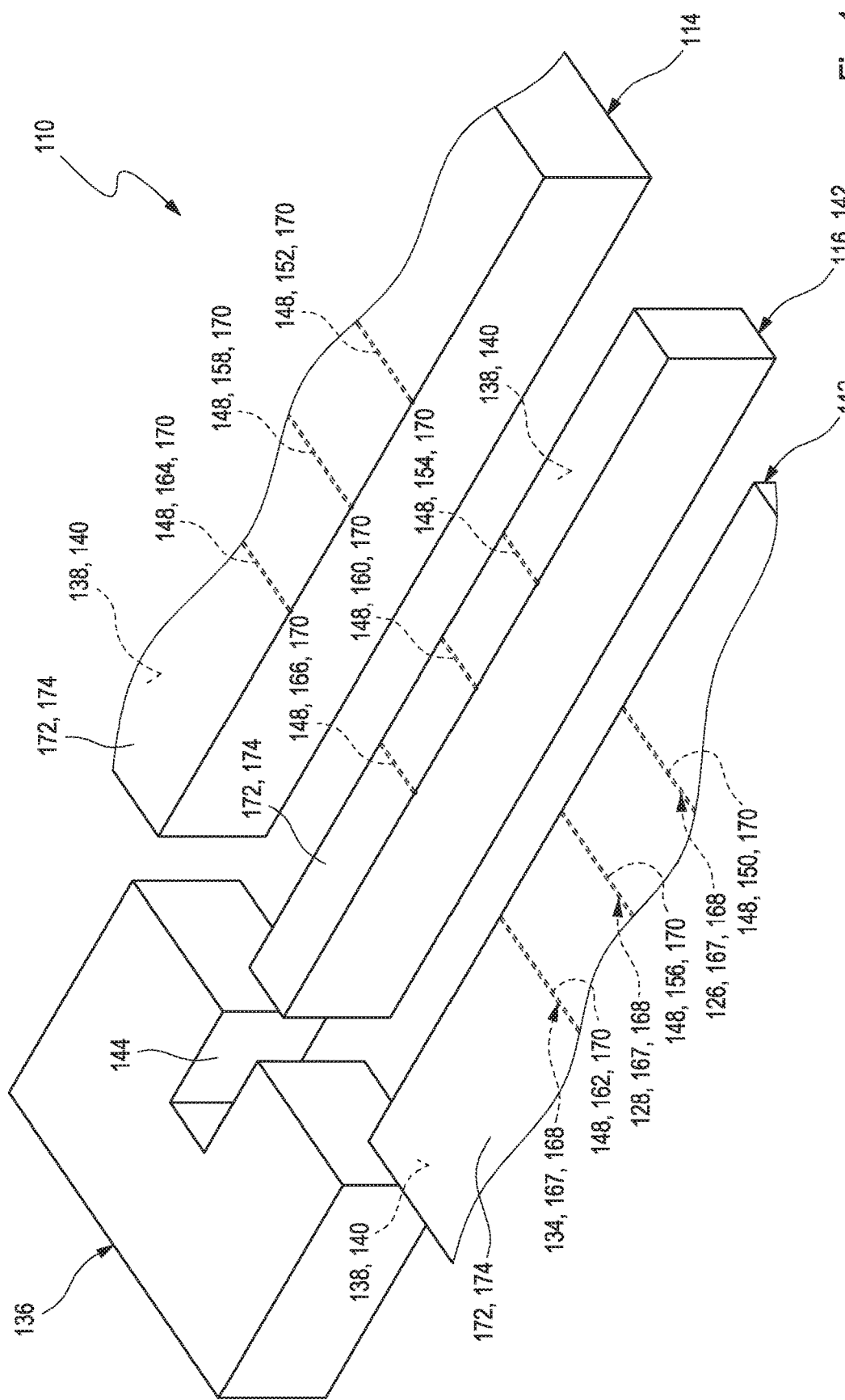

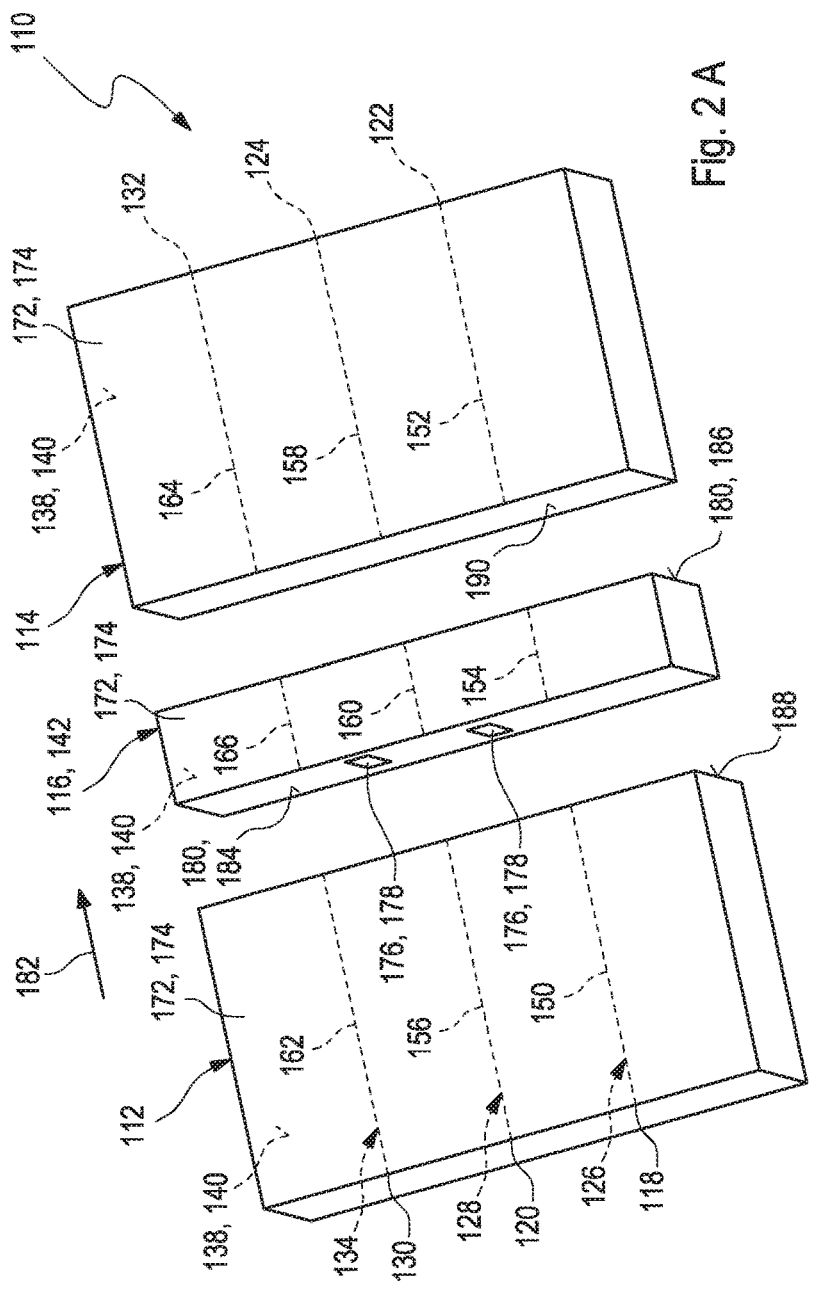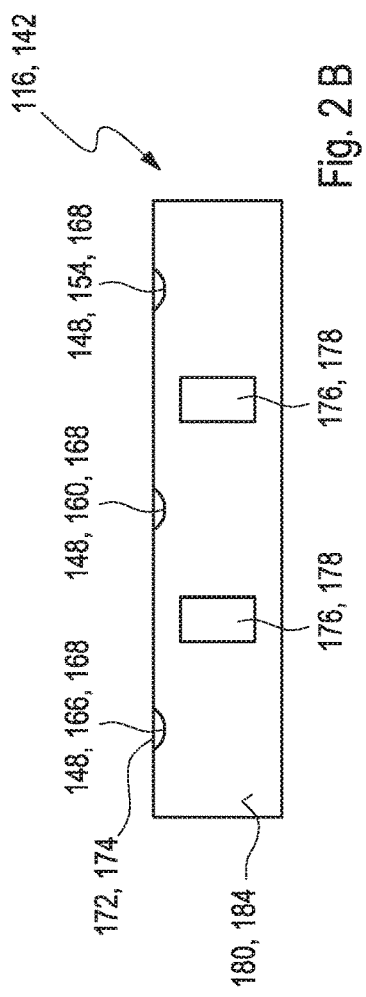

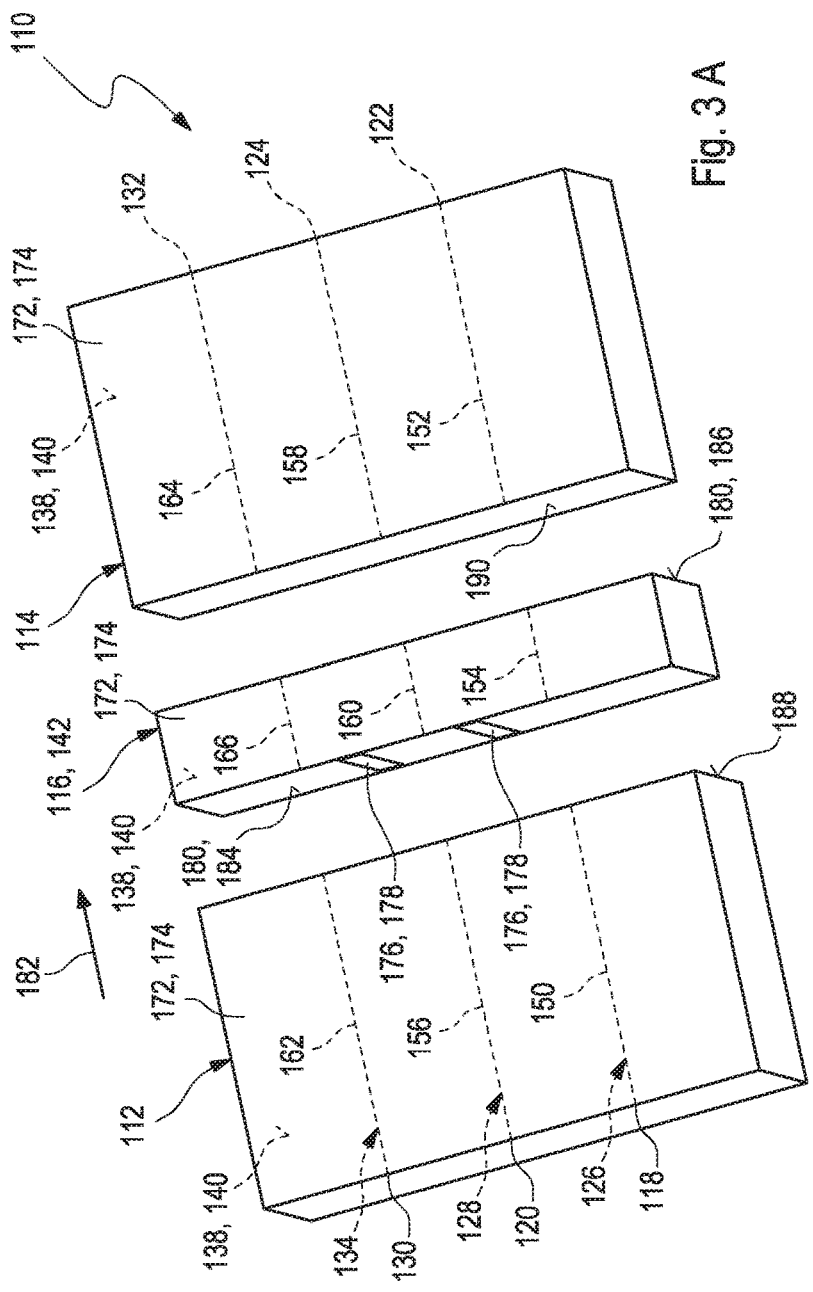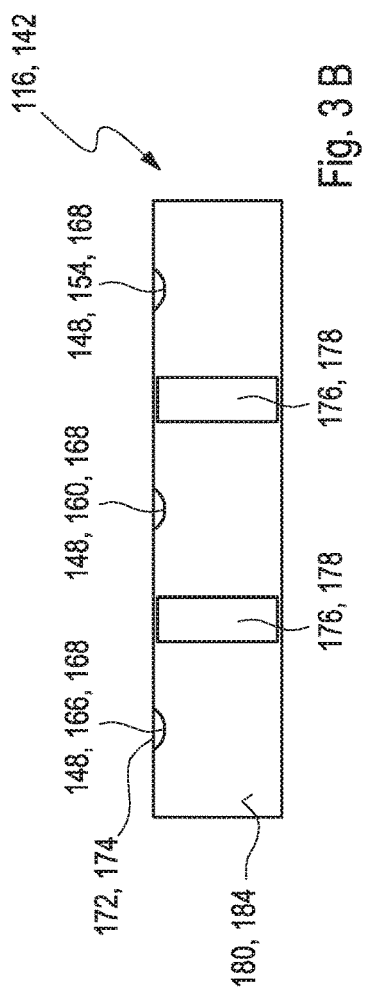

SAMPLE TRANSFER DEVICE AND METHOD FOR SAMPLE TRANSFER

RELATED APPLICATIONS

This application is a continuation of PCT/EP2017/055399, filed Mar. 8, 2017, which claims priority to EP 16 159 128.4, filed Mar. 8, 2016, both of which are hereby incorporated herein by reference in their entirety.

BACKGROUND

This disclosure relates to a sample transfer device, an analytical system for analyzing a sample, a method for sample transfer and a method for manufacturing the sample transfer device. The devices and methods according to this disclosure may specifically be used for multi-dimensional separation of samples and in the field of high throughput assays of molecules. Specifically, the devices and methods according to this disclosure may be applied in the field of bioanalytics, particularly in the field of proteomics and metabolomics. Other applications are feasible.

Several electromigrative separation techniques are used in the field of bioanalytics, particularly in the fields of proteomics and metabolomics. A lot of these techniques are also commonly applied in the pharmaceutical and bio-pharmaceutical industry, particularly for analysis of proteins, specifically for analysis of antibodies, charge variants or other proteoforms. Specifically, mass spectrometry techniques have been applied as important techniques for identifying molecules, including large biomolecules like proteins. A combination of electromigrative separation techniques with mass spectrometry techniques may be challenging, specifically as chemicals such as surfactants which are commonly applied within the electromigrative separation techniques may lead to disturbing effects during conducting a measurement with the mass spectrometry technique. A separation of these chemicals from a sample may generally be realized via additional separation dimensions.

In Rocklin, R. D., Ramsey R. S., Ramsey J. M., Anal Chem. 2000, 72, 5244-5249 a micro-fabricated fluidic device is disclosed. The micro-fabricated fluidic device combines micellar electro-kinetic chromatography and high speed open-channel electrophoresis on a single structure for the rapid automated two-dimensional analysis of peptides. The microchip operates by rapidly sampling and analyzing effluent in the second dimension from the first dimension. Second dimension analyses are performed and completed every few seconds, with total analysis times of less than ten minutes for tryptic peptides. The peak capacity of the two-dimensional separations has been estimated to be in the 500-1000 range. The orthogonality of the separation techniques, an important factor for maximizing peak capacity or resolution elements was verified by examining each technique independently for peptide separations. The two-dimensional separation strategy was found to greatly increase the resolving power over that obtained for either dimension alone.

In Gottschlich N., Jacobson S. C., Culbertson C. T., Ramsey J. M., Anal Chem. 2001, 73, 2669-2674 a two-dimensional separation system on a micro-fabricated device was demonstrated using open channel electro-chromatography as the first dimension and capillary electrophoresis as second dimension. The first dimension was operated under isocratic conditions and the effluent from the first dimension was repetitively injected into the second dimension every few seconds. A 25 cm separation channel with spiral geometry for open-channel electrochromatography was chemically modified with octadecylsilane and coupled to a 1.2 cm straight separation channel for capillary electrophoresis. Fluorescently labelled products from tryptic digests of beta-casein were analyzed in 13 minutes with this system.

In Lu J. J., Wang S., Li G., Wang W., Pu Q., Liu S., Anal Chem. 2012, 84, 7001-7007, a chip capillary hybrid device to integrate capillary isoelectric focusing (CIEF) with parallel capillary sodium dodecyl sulfate-polyacrylamide gel electrophoresis (SDS-PAGE) or capillary gel electrophoresis (CGE) toward automating two-dimensional (2D) protein separations. The hybrid device consists of three chips that are butted together. The middle chip can be moved between two positions to reroute the fluidic parts, which enables the performance of CIEF and injection of proteins partially resolved by CIEF to CGE capillaries for parallel CGE separations in a continuous and automated fashion. Capillaries are attached to the other two chips to facilitate CIEF and CGE separations and to extend the effective lengths of CGE columns. Specifically, we illustrate the working principle of the hybrid device, develop protocols for producing and preparing the hybrid device, and demonstrate the feasibility of using this hybrid device for automated injection of CIEF-separated sample to parallel CGE for two-dimensional protein separation.

In Wang W., Lu J. J., Gu C., Zhou L., Liu S., Anal Chem 2013, 85, 6603-6607, a rotary valve is disclosed and its feasibility for performing isoelectric focusing and simultaneous fractionation of proteins, followed by sodium dodecyl-polyacrylamide gel electrophoresis are demonstrated. The valve has two positions. In one position, the valve routes a series of capillary loops together into a single capillary tube where capillary isoelectric focusing (CIEF) is performed. By switching off to another position, the CIEF-resolved proteins in all capillary loops are isolated simultaneously, and samples in the loops are removed and collected in vails. After the collected samples have been briefly processed, they are separated via sodium dodecyl-polyacrylamide gel electrophoresis (SDS-PAGE, the second dimensional separation) on either a capillary gel electrophoresis instrument or a slab-gel system.

In U.S. Pat. No. 7,189,370 B2 an apparatus is disclosed which integrates one-dimensional separation to another dimensional separation and automates the operation of the two-dimensional separation. The first dimensional separation is performed in one column while the second dimensional separation is performed in multi-separation columns. The integration is achieved using a one-piece, a two-piece, or a three-piece interface.

In U.S. Publication No. 2008/0206102 A1 an apparatus is disclosed which allows separation, fractionation, isolation and fraction collection simultaneously. The device consists of two major pieces, with one piece sliding relatively to the other to facilitate the switching between separation and fractionation.

Despite the advantages and progress achieved by the above-mentioned developments, some significant technical challenges remain. Thus, generally, known techniques for sample transfer generally imply the challenge of tightness and leakage. Further, known systems and devices often are mechanically unstable, which generally may lead to material abrasion and/or voltage drop. Further, an exact transfer of the sample from the first dimension to the second dimension while maintaining a high separation efficiency of electromigrative separation techniques is often challenging, specifically as small dimensions of utilized capillaries and/or a need of a high electrical isolation are generally required.

SUMMARY

This disclosure teaches a sample transfer device, an analytical system for analyzing a sample, a method for sample transfer and a method for manufacturing the sample transfer device which at least partially avoid the shortcomings of known devices and methods and which at least partially address the above-mentioned challenges. Specifically, devices and methods are disclosed which allow for a precise and reliable transfer of well-defined sample volumes, specifically of small sample volumes such as of small sample volumes in the nanoliter range, and which are usable specifically in electromigrative sample separation techniques.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. In the same connection, regardless of whether the phrases "one or more" or "at least one" precede an element or feature presented in this disclosure or claims, it shall be understood that such element or features shall not receive a singular interpretation unless it is made explicit herein. By way of non-limiting example, the terms "block," "slider," "port," to name just a few, should be interpreted when appearing in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of this disclosure a sample transfer device, specifically for use in high-resolution analytics and/or diagnostics, is disclosed. The sample transfer device comprises at least one first block and at least one second block and at least one slider. The first block comprises at least one first port and at least one second port. The second block comprises at least one third port and at least one fourth port. The slider is located between the first block and the second block. The slider is configured to slide from a first position to a second position and vice versa. Both in the first position and in the second position a first straight channel is formed between the first port and the third port and a second straight channel is formed between the second port and the fourth port.

The terms "first block, "second block," "first port," "second port," "third port," "fourth port," "first position" and "second position" may be considered as nomenclature only, without numbering or ranking the named elements, without specifying an order and without excluding a possibility that several kinds of first blocks and second blocks or several kinds of first ports, second ports, third ports, fourth ports or several kinds of first positions and second positions may be present. Further, additional blocks, ports or positions such as one or more third blocks, fifth ports or third positions may be present.

As further used herein the term "sample" may refer to an arbitrary material or combination of materials taken for an analysis, testing or investigation. The sample may be a limited quantity of something which is intended to be similar to and represent a larger amount. However, the sample may also comprise a full specimen. The sample may be solid sample, a liquid sample or a gaseous sample or a combination of these. Specifically, the sample may be a fluid sample, i.e., a sample which fully or partially is in a liquid state and/or in a gaseous state. A quantity of the sample may be describable in terms of its volume, mass or size. However, other dimensions are feasible. The sample may comprise only one material or only one compound. Alternatively, the sample may comprise several materials or compounds.

The term "analyte" generally refers to an arbitrary element, component or compound which may be present in the sample and the presence and/or the concentration of which may be of interest. As an example, the at least one analyte may be selected from the group consisting of proteins; peptides; organic acids, particularly amino acids; pharmaceuticals; biomarkers, particularly cancer biomarkers; antibodies; impurities of pharmaceutical products, particularly of bio pharmaceutical products; variants of pharmaceutical products, particularly of bio pharmaceutical products. Additionally or alternatively, however, other types of analytes may be used and/or any combination of analytes may be determined.

The terms "transfer" or "transferring" may generally refer to an active or passive transportation of an arbitrary material from one location to another location or vice versa. Thereby, the term "active transportation" generally means that the transportation is supported by external forces and/or actuation means such as pumps or valves used for a directed transportation of the material. Thus, the term "active transportation" may also refer to a defined manipulation of the material. The term "passive transportation" may refer to a transportation without external actuation and exemplarily include transportation by capillary forces.

The term "sample transfer device" may generally refer to an arbitrary device which is configured to transfer or to transmit the sample partially or completely from a first dimension or first location into at least one further dimension or further location such as into a second dimension or second location. However, further dimensions like third dimensions are also feasible. The "dimension" may be or may comprise an arbitrary volume configured to receive the sample at least partially such as a vessel or a channel. Still, other embodiments are feasible. The first dimension and the further dimension may be separate dimensions such that the sample or parts of the sample may only be transferred from the first dimension to the further dimension or vice versa by an intervening barrier or space. Exemplarily, the intervening barrier may be the slider as will further be described below. Specifically, the first dimension and the further dimension may be configured for a one dimensional transfer of the sample, respectively, and consequently, the sample transfer device may provide a two dimensional sample transfer. The sample transfer device may be configured to transfer parts of the sample or to transfer specific components of the sample which may be of interest for a user such as one or more of the analytes of the sample. Specifically in the latter case, the sample transfer device may also be referred to as sample separation device.

The term "separation" may generally refer to an arbitrary process of eliminating specific components of a material or sample or may as well refer to an arbitrary process of removing at least one part of the material or the sample from an original residence. Thus, the removed part of the material or the sample and the residual part of the material or the sample may have a different chemical composition, respectively.

The terms "first dimension" and "second dimension" may be considered as description without specifying an order and without excluding a possibility that several kinds of first dimensions and second dimensions may be present. Further, additional dimensions third dimensions may be present.

The term "analytics" may generally refer to an arbitrary application, wherein at least one property such as a chemical and/or physical and/or biological property of the sample or the analyte as described above or as will further be discussed below may be determined. The term "diagnostics" may specifically refer to an arbitrary procedure of determining at least one item of information about a health status of a patient, independent form the fact that the patient may be in a healthy condition or may suffer from one or more diseases. The patient may be a human being or an animal. Therefore, a body fluid of the patient may be utilized to determine the information. However, other procedures are feasible. As further used herein, the term "high-resolution analytics and/or diagnostics" may specifically refer to an analysis of natural materials such as proteins, peptides, plant extracts and/or tissues. However, other materials may be applied.

The term "block" may generally refer to an arbitrary element which may be made of a solid material. Within the block and/or within at least one surface of the block, at least one fluidic structure having one, two or more channels may be embodied. The block, for example, may fully or partially be made from at least one material selected form the group consisting of: glass, particularly silica glass; a polymer, particularly at least one polymer selected from the group consisting of: polytetrafluoroethylene, polyetheretherketone, and mixtures of both, cyclic olefin copolymers, polyacrylates; a ceramic material; a semiconductor material, preferably a semiconductor wafer. Still, other materials are feasible. Optionally, the block may comprise one or more coatings. Specifically, the block may have a rectangular or a cubic shape. Still, other embodiments are feasible. The block may comprise at least one flat surface. Specifically, a top surface of the block may be a flat surface which may be configured to provide parts of the first straight channel and the second straight channel, as will further be described below. Specifically, the flat surface may be configured to provide one or more channel sections, as will further be described below. Further, at least one side surface, specifically a side surface facing the slider, may be a flat surface which may be configured to enable a linear movement of the slider along the side surface. The first block and the second block may have an identical shape or may have a different shape. Specifically, the first block and the second block may have an identical high. Further, the first block and the second block may be oriented parallel to each other. Specifically, the first block and the second block may be oriented parallel to each other such that the first port of the first block and the third port of the second block as well as the second port of the first block and the fourth block of the second block may be oriented in one straight line, respectively. Further, the first block and the second block may be oriented in a distance to each other such that the slider may be localizable between the first block and the second block. The first block, the second block and the slider may be condensed via spring elements and/or clamp elements. The spring elements may be adjustable.

As further used herein, the term "port" may refer to an arbitrary unit which may be configured to connect two or more elements to each other such that a fluid medium or a solid medium may be transferable from one element to another element. Specifically, a port may be a part of a channel having at least one opening which allows for fluid entering the channel or leaving the channel and/or which allows for connecting a fluid connection to the channel. Specifically, the ports may be configured to connect the first straight channel and the second straight channel or at least parts of the first straight channel and the second straight channel to an arbitrary device such as an analytical device as will further be discussed below or to an arbitrary vessel comprising the sample. Exemplarily, the ports may be connectable to the analytical device and/or to the vessel via capillaries. Still, other embodiments are feasible. The port may specifically be a tight port configured to prevent a leakage of the sample at least to a large extend. Therefore, the port may have a low dead volume. The capillaries may specifically be connected by gluing, bonding or welding or by using assemblies of port fittings and screwable fittings.

As further used herein, the term "slider" may refer to an arbitrary element which may be configured to perform a sliding movement from one position to at least another position and vice versa. The slider may be made of a solid material. For example, the slider may be made from at least one material selected form the group consisting of: glass, particularly silica glass; a polymer, particularly at least one polymer selected from the group consisting of: polytetrafluoroethylene, polyetheretherketone (PEEK), cyclic olefin copolymers, polyacrylates; a ceramic material; a semiconductor material, preferably a semiconductor wafer. Still, other materials are feasible.

Specifically, the slider may have a rectangular or a cubic shape. For example, the slider may have a width of less than 20 mm, preferably of less than 10 mm. Specifically, the slider may have a width of 2 mm to 20 mm. Specifically, the first block, the second block and the slider may have an identical height. Still, other embodiments are feasible. The slider may comprise at least one flat surface. Specifically, a top surface of the block may be a flat surface which may be configured to provide parts of the first straight channel and the second straight channel, as will further be described below. Specifically, the flat surface may be configured to provide one or more slider channel sections, as will further be described below. Further, at least one side surface, specifically a side surface facing the first block or the second block, may be a flat surface which may be configured to enable a linear movement of the slider along the first block and the second block. One or more or even all of the first block, the second block or the slider may optionally be provided with at least one coating, specifically at at least one sliding interface between at least two elements, in order to improve a tightness of the interface and/or in order to improve sliding. Thus, an interface of two surfaces, wherein at least one of the surfaces comprises a coating, may be tighter than a non-coated interface. As an example, inorganic or organic coatings may optionally be used.

Specifically, the slider may be a linear slider configured to perform a straight or linear sliding movement from the first position to the second position and vice versa. The term "linear sliding movement" may generally refer to a movement along a straight line. The terms "first position" and "second position" may refer to two different positions of the slider relative to the first block and the second block, specifically relative to the first port and the third port as well as to the second port and the fourth port. Thereby, the term "first position" may refer to an initial position of the slider. At this position, the sample transfer device may be configured to insert the sample into the second straight channel. The term "second position" may refer to a final position of the slider relative to the first block and the second block. At this position, the sample transfer device may be configured to transfer the sample at least partially from the second straight channel into the first straight channel. The terms "first position," "initial position," "second position" and "final position" may be considered as description without specifying an order and without excluding a possibility that the slider may be movable to several kinds of first, second, initial and final positions. As an example, however, the slider may be moveable from precisely one first position or initial position into precisely one second position or final position and vice versa, thereby performing a digital movement a first state to a second state or vice versa.

The term "channel" may generally refer to an arbitrary element which may have an elongate shape and which may provide a free volume or lumen and which enables a flow of a fluid medium there through. Consequently, the channel may be configured to receive a solid or fluid medium and/or to provide a transfer of the medium from one end of the channel to the other end of the channel. The channel may preferably be a tight channel such that a leakage of the medium may be prevented at least to a large extend. The first straight channel and/or the second straight channel may comprise a first end and a second end. The first port and the third port may be located at the first end and at the second end of the first straight channel, respectively. The second port and the forth port may be located at the first end and at the second end of the second straight channel, respectively.

As further used herein, the term "straight" may refer to a continuous extension of the first straight channel and the second straight channel in one direction without a bend, angle or curve. Consequently, the first straight channel and the second straight channel may extend in one dimension. However, small aberrations of the first straight channel and/or the second straight channel from the extension in one dimension may be existent specifically due to slight inaccuracies during manufacturing of the sample transfer device which will further be described below in more detail.

The first straight channel and the second straight channel may be oriented parallel to each other. The first straight channel and the second straight channel may be separated by a distance of at least 5 mm, preferably of at least 10 mm and more preferably of at least 15 mm. Specifically, the first straight channel and the second straight channel may be separated by a distance of 5 mm to 15 mm. Generally, even higher distances between the first straight channel and the second straight channel may be realizable. For higher distances between the first straight channel and the second straight channel there may be no limitations.

The first block, the second block and the slider may each comprise straight channel sections. As further used herein, the term "channel section" may refer to at least one part of the first straight channel or of the second straight channel. Thus, two or more straight channel sections may form the first straight channel and/or the second straight channel. The straight channel sections may be exchangeable such that the first straight channel and/or the second straight channel may be formable with different combinations of channel sections. Specifically, the slider channel section may be configured to be exchanged during conducting the method for sample transfer as will further be described below. The combination of channel sections may specifically be reversible. The straight channel sections may be oriented essentially parallel. The term "essentially parallel" may refer to an extension of the straight channel sections in one dimension although small aberrations of the straight channel sections from the extension in one dimension may be existent specifically due to slight inaccuracies during manufacturing of the sample transfer device which will further be described below in more detail.

The first straight channel and the second straight channel may have a constant cross-section. Specifically, the straight channel sections and the slider channel section may have essentially identical cross-sections. The term "essentially identical" may generally include small aberrations of one or more of the straight channel sections and/or of the slider channel section from the identical cross-sections specifically due to slight inaccuracies during manufacturing of the sample transfer device which will further be described below in more detail.

Specifically, the first straight channel and/or the second straight channel may comprise at least two straight channel sections located on the first block and the second block and at least one slider channel section located on the slider. Thus, the first straight channel and/or the second straight channel may comprise the slider channel section and the two straight channel sections wherein a first straight channel section is located on the first block and the second straight channel section is located on the second block, respectively.

The channel sections may be "open channels." As further used herein, the term "open channel" may generally refer to a slot or a trench cut into a surface of a solid material, specifically into a smooth surface of the solid material. The open channels may be through such that the open channel may pass all the way through the surface of the solid material and such that ends of the open channel may be accessible. Alternatively, the open channel may be stopped such that one or both of the ends may finish before the open channel meets an edge of the surface. Thus, the open channels may exemplarily be formed as grooves. Specifically, the channel sections may be formed as grooves in surfaces of the first block, the second block and the slider, respectively.

The grooves may be at least partially covered by at least one cover element. The term "cover element" may generally refer to an arbitrary element which has a surface configured to be attachable to a further surface of a further element. Thus, a shape of the surface of the cover element and a shape of the further surface of the further element may be complementary to each other. Exemplarily, the surface of the cover element and the further surface of the further element may be flat surfaces such that a tight connection between the surface and the further surface may be formable. The cover element may specifically be made of an optically transparent material such as glass. However, other materials are also feasible. The cover element may be a common cover element for the first block, the second block and the slider.

The first straight channel and the second straight channel may be microfluidic channels. As further used herein, the term "microfluidic channels" may refer to dimensions of the first straight channel and the second straight channel at a small, typically sub-millimeter scale. The first straight channel and the second straight channel may be microfabricated. Particulars will further discussed below in more detail. Exemplarily, the first straight channel and the second straight channel may at least partially have a round cross-section, an oval cross-section or a trapezoidal cross-section with a diameter of 5 µm to 500 µm, preferably of 20 µm to 100 µm. Further, the first straight channel and the second straight channel may at least partially have a rectangular cross-section with a width of 20 µm to 500 µm, preferably of 50 µm to 200 µm and more preferably of 100 µm, and with a depth of 5 µm to 100 µm, preferably of 10 µm to 50 µm and more preferably of 30 µm. Still, other embodiments are feasible. Further, the slider channel section may have a volume of at least 2 nl. Specifically, the slider channel section may have a volume of 2 nl to 100 nl. Still, other embodiments are feasible.

The terms "at least partially round" and "at least partially rectangular" generally refer to an arbitrary shape, wherein at least parts of the shape may be round or rectangular. However, the shape may at the same time also comprise further characteristics. Exemplarily, the shape may comprise a combination of round and rectangular characteristics. Still, other shapes are also possible like an oval shape or a triangular shape or another arbitrary polygonal shape or a combination of these.

The slider may comprise at least one cavity configured to receive excessive fluid. The term "cavity" may generally refer to an arbitrary void volume within a surface of a solid material, such as the surface of the slider. The cavity may have dimensions in the sub-millimeter range and may thus be micro-fabricated. Further, the cavity may have at least one cross-section selected from the group consisting of: a round cross-section, an oval cross-section, a polygonal cross-section, particularly a rectangular cross-section. Specifically, the cavity may comprise at least one straight cavity channel oriented perpendicular to the first and second straight channels.

Exemplarily, the cavity may be located between the first straight channel and the second straight channel while the slider is in the first position. Specifically, the cavity may be located on at least one lateral face of the slider perpendicular to a direction of extension of the sample transfer device. Specifically, the slider may comprise a first slider front face facing the first block. The first slider front face may slide on a first front face of the first block. The slider may further comprise a second slider front face facing the second block. The second slider front face may slide on a second front face of the second block. The cavity may be located on one or both of the first or second slider front face. The cavity may fully penetrate the lateral face of the slider. Still, other embodiments are feasible.

The terms "first slider front face" and "second slider front face" may be considered as description without specifying an order and without excluding a possibility that several kinds of first slider front faces and second slider front faces may be applied. Further, additional slider front faces such as third slider front faces may be applied.

The sample transfer device may further comprise at least one stopper configured to limit a movement of the slider in linear direction. As further used herein, the term "stopper" generally refers to an arbitrary element configured to limit a movement of a further element in at least one dimension. Specifically, the stopper may be made of at least one solid material. Further, the stopper may comprise at least one lateral surface facing a lateral surface of the slider. The lateral surface of the stopper and the lateral surface of the slider may be complementary to each other. Exemplarily, the lateral surface of the stopper and the lateral surface of the slider may be flat surfaces and may be parallel to each other. Exemplarily, the stopper may comprise at least one receptacle configured to receive at slider at least partially. Thus, a geometry of the receptacle may correspond to a geometry of the slider or of parts of the slider. A position of the stopper may be adjustable, particularly by micrometer screws. The position of the stopper may define one or both of the first position or the second position of the slider.

The sample transfer device may further comprise at least one actuator configured to move the slider in a linear direction. As further used herein, the term "actuator" refers to an arbitrary element which is configured to move or control a mechanism or a system. Specifically, the actuator may be configured to move the slider from the first position to the second position and vice versa. The actuator may be operated by a source of energy, typically electric current or mechanical pressure and may convert energy into motion. The actuator may be selected from the group consisting of: a mechanical actuator, an electromagnetic actuator, a pneumatic actuator, a hydraulic actuator. However, other kinds of actuators may be applied.

Specifically, the actuator may be a bi-modal actuator having a first actuation position and a second actuation position only, wherein, in the first actuation position, the slider is in the first position, and wherein, in the second actuation position, the slider is in the second position. The terms "first actuation position" and "second actuation position" may be considered as description without specifying an order and without excluding a possibility that several kinds of first actuation positions and second actuation positions may be applied. Further, additional actuation positions such as third actuation positions may be applied.

Exemplarily, the first block may comprise at least one fifth port and the second block may comprise at least one sixth port. In the first position, a further straight channel may be formed between the fifth port and the sixth port. The further straight channel may be configured to provide at least one fluid for rinsing, for positioning a plug or for inserting a reagent for digestion, complexation, stacking, dynamic pH junction, transient isotachophoresis or derivatization. The further straight channel may have the same properties as the first straight channel and/or the second straight channel as described above. The sample transfer device may further comprise at least one pump for providing fluid to the fifth port, preferably at least one syringe pump.

Specifically, the sample may comprise at least two sliders, preferably at least three sliders. The sliders may be oriented in a parallel fashion. The sliders may be located adjacent to each other in between the first block and the second block. The first block may comprise at least one seventh port and at least one eight port. The second block may comprise at least one ninth port and at least one tenth port. In the first position a third straight channel is defined between the seventh port and the ninth port and a fourth straight channel is defined between the eight port and the tenth port. The third channel and the fourth channel may be configured to provide at least one fluid selected from the group consisting of: a fluid for rinsing; a derivatization reagent; a substance for stacking; a substance for a dynamic pH junction technique; a fluid for transient isotachophoresis; a fluid for complexation; a digestion reagent.

In a further aspect of this disclosure, an analytical system for analyzing a sample is disclosed. As further used herein, the term "system" refers to a group of at least two elements which may interact with each other in order to fulfill at least one common function. The at least two components may be handled independently or may be coupled, connectable or integratable in order to form a common component. Thus, an "analytical system" generally refers to a group of at least two elements or components which are capable of interacting in order to perform at least one sample transfer and at least one analytical detection, specifically at least one analytical detection of the analyte of the sample. The analytical system may generally also be referred to as an analytical kit, a sensor system or a measurement system.

The analytical system comprises the sample transfer device sample transfer device according to any embodiment as described above or as will further be described below. It shall be noted, however, that other embodiments are feasible. The analytical device further comprises at least one analytical device fluidically connected to the sample transfer device.

The term "analytical device" generally refers to an arbitrary device configured for conducting at least one analytical measurement. The analytical device may preferably be an electronic device, which may be handled independently form the sample transfer device. The analytical device may be adapted to interact with the sample transfer device in order to derive at least one item of information of the analyte of the sample. Specifically, the analytical device may be adapted to detect at least one signal produced by the analyte as will further be described below in more detail. Thus, the analytical device may comprise at least one electronic evaluation device in order to derive the at least one item of information of the analyte from the at least one signal. Thus, the analytical device may comprise at least one evaluation unit comprising at least one data processing device, such as a microcontroller.

The analytical device specifically may be selected from the group consisting of: a sample separation device, preferably a capillary electrophoresis device; a mass spectrometer, preferably a matrix-assisted laser desorption/ionization time of flight mass spectrometer, more preferably an electrospray ionization mass spectrometer; a capillary isoelectric focusing device; an isotachophoresis device; a chromatograph, preferably a chromatograph selected from the group consisting of a liquid chromatograph and a gas chromatograph, more preferably a high-performance liquid chromatograph; a size exclusion chromatograph; an ion-exchange chromatograph; an affinity chromatograph; a capillary electro chromatograph (CEC); a micellar electrokinetic chromatograph (MEKC); a combination of an ion exchange and a reversed phase liquid chromatrograph; a fraction collector. Specifically, the liquid chromatograph may be configured for conducting normal phase separation and/or reversed phase separation.

The term "fluidically" may generally refer to a property, wherein two or more elements are connected such that a transfer of an arbitrary fluid medium from one of the two elements to the other one of the two elements or vice versa is provided. Exemplarily, the analytical device may be connected to the sample transfer device via at least one capillary. Specifically, at least one port selected from the group consisting of the first port, the second port, the third port and the fourth port may be connected to the at least one analytical device, preferably via the at least one capillary. The term "capillary" generally refers to an arbitrary small, elongate void volume such as a small tube. Generally, the capillary may comprise dimensions in the sub-millimeter range. Commonly, a fluidic medium may migrate through the capillary by capillary action wherein the fluidic medium may flow in narrow spaces of the capillary without an assistance of external forces like gravity due to intermolecular forces between the fluidic medium and a surface of the capillary facing the fluidic medium.

Exemplarily, the analytical system may comprise at least two analytical devices. At least one first analytical device may be connected to the first block and the at least one second analytical device may be connected to the second block. The first and second analytical devices may be one of identical types or different types of analytical devices. The at least one first analytical device may comprise at least two first analytical devices connected to different ports of the first block. The at least one second analytical device may comprise at least two second analytical devices connected to different ports of the second block.

In a further aspect of this disclosure, a method for sample transfer, the method using the sample transfer device according to any embodiment as described above or as will further be described below, and a method for manufacturing the sample transfer device according to any embodiment as described above or as will further be described below, are disclosed.

The disclosed methods are listed as follows. The method steps may be performed in the given order. However, other orders of the method steps are feasible. Further, one or more of the method steps may be performed in parallel and/or on a timely overlapping fashion. Further, one or more of the method steps may be performed repeatedly. Further, additional method steps may be present which are not listed.

The method for sample transfer comprises the following steps:
  a) feeding a sample into the second straight channel of the sample transfer device;
  b) transferring at least one part of the sample to the first straight channel of the sample transfer device by linearly moving the slider from the first position to the second position.

The sample transfer device may be embodied as outlined above, according to one or more of the embodiments listed above or listed in further detail below. It shall be noted, however, that other embodiments are feasible.

As further used herein, the term "feed" may generally refer to an arbitrary process of adding or loading an arbitrary free volume with a material or a sample. Therefore, the free volume may be fluidically connected to the material or the sample. Thereby, the material or the sample may be transferred to the free volume by active or by passive transportation as described above or as will further be described below.

Before performing step a), the first straight channel and/or the second straight channel may be rinsed simultaneously with at least one fluid. Further, before performing step a), the sample may be injected into the second straight channel, particularly by at least one capillary which is connected to the second port or to the fourth port of the sample transfer device. Exemplarily, a capillary electrophoresis device may be connected to the second port and to the fourth port and an electrical potential may be applied to the second straight channel during performing step a).

The slider may be moved from the first position to the second position or vice versa in less than 5 s, preferably in less than 1 s, more preferably in less than 550 ms, most preferably in 500 ms or less than 500 ms. Step b) may specifically be performed when a predetermined analyte of the sample is positioned in a slider channel section of the second straight channel which is located on the slider. A position of the analyte within the second straight channel may be determined by using at least one optical technique. The term "optical technique" may generally refer to an arbitrary technique, wherein at least one optical property of a material or a sample is determined. Thus, the method for sample transfer may further comprise the following step:

c) detecting an analyte, wherein the first port and/or the third port are connected to at least one analytical device.

The analytical device may exemplarily be a mass spectrometer. As further used herein, the term "detect" generally refers to the process of determining a presence and/or a quantity and/or a concentration of the at least one analyte. Thus, the detection may be a qualitative detection, simply determining the presence of the at least one analyte or the absence of the at least one analyte, and/or may be or may comprise a quantitative detection, which determines the quantity and/or concentration of the at least one analyte. As a result of the detection, at least one signal may be produced which characterizes an outcome of the detection, such as at least one measurement signal.

As further used herein, the term "determining a concentration" generally refers to a process of generating at least one representative result or a plurality of representative results indicating the concentration of the analyte in the sample.

For example, the sample transfer device may further comprise at last two further sliders located between the first block and the second block. The first block may comprise at least one seventh port and at least one eight port. The second block may comprise at least one ninth port and at least one tenth port. The two further sliders may be moved in the first position. In the first position a third straight channel may be defined between the seventh port and the ninth port and a fourth straight channel may be defined between the eight port and the tenth port. In the first position, at least one channel selected from the group consisting of: the first straight channel; the second straight channel; the third straight channel; the fourth straight channel, may rinsed with at least fluid selected from the group consisted of: a fluid for rinsing; a derivatization reagent; a substance for stacking; a substance for a dynamic pH junction technique; a fluid for transient isotachophoresis; a fluid for complexation; a digestion reagent. Specifically, in the second position the slider and the two further sliders may be linearly moved such that the first straight channel is formed.

The method for manufacturing a sample transfer device comprises the following steps. Again, the method steps may be performed in the given order. However, other orders of the method steps are feasible. Further, one or more of the method steps may be performed in parallel and/or on a timely overlapping fashion. Further, one or more of the method steps may be performed repeatedly. Further, additional method steps may be present which are not listed. The method steps comprised by method for manufacturing a sample transfer device are as follows:

I. providing at least one substrate;
II. generating the at least two straight channels on a surface of the substrate;
III. cutting the substrate in order to form the at least one first block, the at least one slider and the at least one second block, wherein, during the cutting, at least two straight separating lines are generated.

The sample transfer device may be embodied as outlined above, according to one or more of the embodiments listed above or listed in further detail below. It shall be noted, however, that other embodiments are feasible.

The substrate may be made from at least one material selected from the group consisting of: glass, particularly silica glass; a polymer, particularly at least one polymer consisting of the group selected from: polytetrafluoroethylene, polyetheretherketone, cyclic olefin copolymers, polyacrylates; a ceramic material; a semiconductor material, preferably a semiconductor wafer. However, other materials are feasible. The channels may be open channels, preferably grooves. The at least two straight channels may be generated by using at least one microstructure technology. The term "microstructure technology" may generally refer to an arbitrary technique configured for generating one or more structures with dimensions in the sub-millimeter scale on a surface of an arbitrary material. Specifically, the two straight channels may be generated by etching, particularly by utilizing hydrofluoric acid. As further used herein, the term "etching" may refer to an arbitrary process of using at least one acid or mordant on order to generate at least one relief in a surface of a material. The etching may also include photo-etching, wherein the material comprises at least one light sensitive polymer such as a photo-sensitive coating and wherein light is projected as a negative image to expose it. Still, other methods of etching are feasible. Further, the microstructure technology may comprise one or more of lithography, laser ablation, embossing. The term "lithography" may generally refer to an arbitrary patterning method, wherein a material may be structured on a fine scale such as on the sub-millimeter scale. Typically, the patterning method may be applied to a semiconductor material like a microchip. Generally, the patterning method may utilize a prefabricated photomask as a mater from which a final pattern is derived. The term "laser ablation" may generally refer to arbitrary process of removing at least a part of a material from a surface by irradiating the surface punctually with a laser beam. Thereby, the material may be heated and thus be evaporated or sublimated. The term "embossing" may generally refer to an arbitrary process for producing a relief into a material, specifically in a metallic material. Exemplarily, the process may involve passing a sheet or a strip of the material between rolls of a desired pattern. However, other embodiments of the above described methods as well as further methods may be applied.

Further, the two straight channels may be coated with at least one coating material. The coating material may comprise at least one of a surfactant or a material configured for at least partially preventing an adhesion of proteins to a surface of the channels. Exemplarily, an Ultra Trol™ dynamic Pre-Coat LN obtained from Target Discovery (Palo Alto, Calif., United States) as dynamic coating may be applied. The coating may have to be renewed every 1 to 20 runs depending in the utilized analyte and cleaning solutions. Additionally or alternatively, polyvinylalcohol may be applied. Commonly, in case the coating comprises polyvinylalcohol, a permanent coating may be provided which does usually have to be renewed in larger time intervals than in case of Ultra Trol' dynamic Pre-Coat LN. Beyond, additionally or alternatively, polyacrylamide, hypromellose and/or polylayers of polydextrane may be applied.

The method may further comprise at least partially covering the channels with at least one cover element as described above or as will further be described below. The cover element may comprise at least one of a cover plate, a wafer or a glass plate. The cover element may be bonded onto one or more of the first block, the second block or the slider. The term "bonding" may generally refer to an arbitrary process of assembling two or more surfaces to each other, specifically by a chemical bond. Exemplarily, the bonding may be conducted by at least one thermal treatment. Still, other methods are feasible. The method may further comprise connecting ends of the two straight channels to capillaries as described above or as will further be described below. The two straight channels may be connected to the capillaries by adhesive force such as by adherence. However, other methods are feasible.

Further, a use of a sample transfer device according to any embodiment as described above or as will further be described below, for at least one purpose of use selected from the group consisting of: multi-dimensional separation, specifically comprehensive or heart-cut two-dimensional separation, of complex samples, samples of biological origin, of extracts of natural materials, preferably of protein samples or peptide samples, preferably of herbs, plants, organisms/tissues, pharmaceuticals, preferably pharmaceuticals to characterize active pharmaceutical ingredients, excipients and/or impurities; mass spectroscopy detection of protein charge variants; mass spectroscopy detection of proteoforms; interference free connection of electro driven separation techniques which use non volatile substances to a mass spectrometer, separation of analytes and mass spectroscopy interference substances, is disclosed.

The proposed sample transfer device, the proposed analytical system for analyzing a sample, the proposed method for sample transfer and the proposed method for manufacturing the sample transfer device provide many advantages over know devices and methods.

This disclosure generally teaches a concept of a flat mechanical sample transfer device with a transfer volume in the range of 2 nl to 100 nl, specifically configured for combining diverse and discreet microfluidic and/or electromigrative sample separation techniques. Generally, samples may be transferred from different channels by applying microfluidic channels on a chip. The transfer may be conducted by applying a slider, which may be moveable between two positions.

The sample transfer device may specifically enable an inward and outward transfer of the analyte between the first dimension and the second dimension as described above. Therefore, a separation technique may be combined with a mass spectrometer technique via a second separation technique which is compatible with the mass spectrometer technique. The transfer volume may be adapted via the width of the slider. The sample transfer device may specifically be combinable with at least one of the following: at least one electromigrative separation technique, such as two dimensional capillary zone electrophoresis-mass spectrometry (CZE-CZE-MS), specifically for proteins and/or oligonucleotides; capillary isoelectric focusing capillary zone electrophoresis-mass spectrometry (CIEF-CZE-MS) or capillary isoelectric focusing liquid chromatography-mass spectrometry (CIEF-LC-MS), specifically for proteins including monoclonal antibodies and/or charge variants; ion chromatography capillary zone electrophoresis-mass spectrometry (IC-CZE-MS); liquid chromatography capillary zone electrophoresis-mass spectrometry (LC-CZE-MS).

Further, diverse materials, specifically glass, may be applied for manufacturing the sample transfer device. Specifically, chemically inert materials such as glass, ceramics and/or polymers may be applied. Therefore, the first straight channel and/or the second straight channel may be rinsed and/or coated with all common chemicals.

Further, voltage drops and/or a leakage of the sample may be at least partially avoided by applying flat, straight channels. On the contrary, the state of the art generally shows concepts which comprise curves and irregularities within the channels.

Moreover, the first straight channel and the second straight channel may be separated at least by a distance of 5 mm to 50 mm. Generally, for higher distances between the first straight channel and the second straight channel, there may be no limitations. Distances in the range of a few centimeters may specifically be applied. Therefore, a high electrical voltage may be applicable. This may specifically be necessary for achieving an optimal separation of the sample. Further, specifically, silica glass may be applied which shows a high dielectric strength, specifically in the range of 400 kV/mm to 1000 kV/mm. The state of the art generally shows separation devices, wherein the channels are separated by a distance of around 0.5 mm. Further, polymers are commonly applied, wherein the polymers show an electrical dielectric strength in the range of 10 kV/mm to 30 kV/mm.

Further, specifically, the first block, the second block and the slider may be manufactured by cutting one single substrate in several pieces. Thereby, the first straight channel and the second straight channel may be generated on a surface of the substrate before cutting the substrate. Therefore, an exact position of the first straight channel and the second straight channel and/or of the channel sections relative to each other may be provided. Thus, problems during transfer of samples between the first block, the second block and/or the slider may at least partially be avoided.

Further, the sample transfer device may be specifically manufactured in a simple manner. Specifically, established processes for manufacturing may be applied. Generally, all common techniques for microstructuring may be applied. The transfer volume may be adapted by adjusting the width of the slider. A minimal transfer volume of up to 2 nl may be possible. Further, the first straight channel and the second straight channel as well as further straight channels may be rinsed and/or coated parallel and independently from each other. The first straight channel and the second straight channel and further straight channels may specifically be mechanically separated by each other and an application of membranes may not be necessary. Therefore, a whole range of common chemicals may be applied.

The sample transfer device specifically may be positioned within a frame comprising spring elements and/or clamps. Therefore, a pressure which may be configured to compress the first block, the second block and/or the slider may be adjustable. Specifically, the pressure may be configured to at least partially avoid leakage through polishing and/or coating and may thus provide a transfer between the first dimension and the second dimension and a movement of the slider without loss of the sample or of other fluids.

Further, cavities between the first straight channel and the second straight channel and/or further straight channels, may be located on the first block, the second block and/or the slider. Thus, fluid which may be present between the first block and the slider or between the second block and the slider during movement of the slider may be collected. Therefore, a fluidic and/or electrical connection between the first dimension and the second dimension may be avoided. Beyond, different steps of rinsing may be combinable with the method of sample transfer, specifically by applying further straight channels and an optional movement of the slider into a counter-direction.

Summarizing the findings of this disclosure, the following embodiments are preferred:

Embodiment 1

A sample transfer device, specifically for use in high-resolution analytics and/or diagnostics, wherein the sample transfer device comprises:
 at least one first block and at least one second block, wherein the first block comprises at least one first port and at least one second port, wherein the second block comprises at least one third port and at least one fourth port;
 at least one slider, wherein the slider is located between the first block and the second block, wherein the slider is configured to slide from a first position to a second position and vice versa;
wherein both in the first position and in the second position a first straight channel is formed between the first port and the third port and a second straight channel is formed between the second port and the fourth port.

Embodiment 2

The sample transfer device according to the preceding embodiment, wherein the slider is a linear slider configured to perform a linear sliding movement from the first position to the second position and vice versa.

Embodiment 3

The sample transfer device according to any one of the preceding embodiments, wherein the first block, the second block and the slider each comprise straight channel sections.

Embodiment 4

The sample transfer device according to the preceding embodiment, wherein the channel sections are oriented essentially parallel.

Embodiment 5

The sample transfer device according to any one of the two preceding embodiments, wherein the channel sections all are formed as grooves in surfaces of the first block, the second block and the slider, respectively.

Embodiment 6

The sample transfer device according to the preceding embodiment, wherein the grooves are at least partially covered by at least one cover element.

Embodiment 7

The sample transfer device according to the preceding embodiment, wherein the cover element is a common cover element for the first block, the second block and the slider.

Embodiment 8

The sample transfer device according to any one of the preceding embodiments, wherein the first straight channel and the second straight channel are separated by a distance of at least 5 mm, preferably of at least 10 mm and more preferably of at least 15 mm.

Embodiment 9

The sample transfer device according to any one of the preceding embodiments, wherein the first straight channel and the second straight channel are separated by a distance of 5 mm to 15 mm.

Embodiment 10

The sample transfer device according to any one of the preceding embodiments, wherein the first straight channel and the second straight channel are microfluidic channels.

Embodiment 11

The sample transfer device according to the preceding embodiment, wherein the first straight channel and the second straight channel at least partially have a round cross-section with a diameter of 5 µm to 500 µm, preferably of 20 µm to 100 µm.

Embodiment 12

The sample transfer device according to any one of the two preceding embodiments, wherein the first straight channel and the second straight channel at least partially have a rectangular cross-section with a width of 20 µm to 500 µm, preferably of 50 µm to 200 µm and more preferably of 100 µm, and with a depth of 5 µm to 100 µm, preferably of 10 µm to 50 µm and more preferably of 30 µm.

Embodiment 13

The sample transfer device according to any one of the preceding embodiments, wherein the first straight channel and the second straight channel have a constant cross-section.

Embodiment 14

The sample transfer device according to any one of the preceding embodiments, wherein the first straight channel and/or the second straight channel comprise at least two channel sections located on the first block and the second block and at least one slider channel section located on the slider.

Embodiment 15

The sample transfer device according to the preceding embodiment, wherein the channel sections and the slider channel section have essentially identical cross-sections.

Embodiment 16

The sample transfer device according to any one of the two preceding embodiments, wherein the slider channel section has a volume of at least 2 nl.

Embodiment 17

The sample transfer device according to any one of the three preceding embodiments, wherein the slider channel section has a volume of 2 nl to 100 nl.

Embodiment 18

The sample transfer device according to any one of the preceding embodiments, wherein the slider has a width of less than 20 mm, preferably of less than 10 mm.

Embodiment 19

The sample transfer device according to any one of the preceding embodiments, wherein the slider has a width of 2 mm to 20 mm.

Embodiment 20

The sample transfer device according to any one of the preceding embodiments, wherein the first block comprises at least one fifth port and the second block comprises at least one sixth port, wherein in the first position a further straight channel is formed between the fifth port and the sixth port.

Embodiment 21

The sample transfer device according to the preceding embodiment, wherein the further straight channel is configured to provide at least one fluid for rinsing.

Embodiment 22

The sample transfer device according to the preceding embodiment, wherein the sample transfer device further comprises at least one pump for providing fluid to the fifth port, preferably at least one syringe pump.

Embodiment 23

The sample transfer device according to any one of the preceding embodiments, wherein the sample transfer device further comprises at least one stopper configured to limit a movement of the slider in linear direction.

Embodiment 24

The sample transfer device according to the preceding embodiment, wherein a position of the stopper is adjustable, particularly by micrometer screws.

Embodiment 25

The sample transfer device according to any one of the two preceding embodiments, wherein the position of the at least one stopper defines one or both of the first position or the second position of the slider.

Embodiment 26

The sample transfer device according to any one of the preceding embodiments, wherein the sample transfer device further comprises at least one actuator configured to move the slider in a linear direction.

Embodiment 27

The sample transfer device according to the preceding embodiment, wherein the actuator is selected from the group consisting of: a mechanical actuator, an electromagnetic actuator, a pneumatic actuator, a hydraulic actuator.

Embodiment 28

The sample transfer device according to any one of the two preceding embodiments, wherein the actuator is a bi-modal actuator, having a first actuation position and a second actuation position only, wherein, in the first actuation position, the slider is in the first position, and wherein, in the second actuation position, the slider is in the second position.

Embodiment 29

The sample transfer device according to any one of the preceding embodiments, wherein the first block, the second block and the slider are condensed via spring elements and/or clamps, wherein the spring elements and/or the clamps are adjustable.

Embodiment 30

The sample transfer device according to any one of the preceding embodiments, wherein the slider comprises at least one cavity configured to receive excessive fluid.

Embodiment 31

The sample transfer device according to the preceding embodiment, wherein the cavity is located between the first straight channel and the second straight channel while the slider is in the first position.

Embodiment 32

The sample transfer device according to any one of the two preceding embodiments, wherein the cavity is located on at least one lateral face of the slider perpendicular to a direction of extension of the sample transfer device.

Embodiment 33

The sample transfer device according to any one of the three preceding embodiments, wherein the cavity fully penetrates the lateral face of the slider.

Embodiment 34

The sample transfer device according to any one of the four preceding embodiments, wherein the cavity has at least one cross-section selected from the group consisting of: a round cross-section, an oval cross-section, a polygonal cross-section, particularly a rectangular cross-section.

Embodiment 35

The sample transfer device according to any one of the five preceding embodiments, wherein the cavity comprises at least one straight cavity channel oriented perpendicular to the first and second straight channels.

Embodiment 36

The sample transfer device according to any one of the six preceding embodiments, wherein the slider comprises a first slider front face facing the first block, wherein the first slider front face slides on a first front face of the first block, wherein the slider further comprises a second slider front face facing the second block, wherein the second slider front face slides on a second front face of the second block, wherein the cavity is located in one or both of the first or second slider front face.

Embodiment 37

The sample transfer device according to any one of the preceding embodiments, wherein the sample transfer device comprises at least two sliders, preferably at least three sliders.

Embodiment 38

The sample transfer device according to the preceding embodiment, wherein the sliders are oriented in a parallel fashion.

Embodiment 39

The sample transfer device according to any one of the two preceding embodiments, wherein the sliders are located adjacent to each other in between the first block and the second block.

Embodiment 40

The sample transfer device according to any one of the three preceding embodiments, wherein the first block comprises at least one seventh port and at least one eight port, wherein the second block comprises at least one ninth port and at least one tenth port, wherein in the first position a third straight channel is defined between the seventh port and the ninth port and a fourth straight channel is defined between the eight port and the tenth port.

Embodiment 41

The sample transfer device according to the preceding embodiment, wherein the third straight channel and the fourth straight channel are configured to provide at least one fluid selected from the group consisting of: a fluid for rinsing; a derivatization reagent; a substance for stacking, a substance for a dynamic pH junction technique, a fluid for complexation; a fluid for digestion, particularly a fluid for proteolytic digestion; a fluid for transient isochophoresis; a fluid for derivatisation.

Embodiment 42

An analytical system for analyzing a sample, the analytical device comprising the sample transfer device according to any one of the preceding claims, the analytical device further comprising at least one analytical device fluidically connected to the sample transfer device.

Embodiment 43

The analytical system according to the preceding embodiment, wherein at least one port selected from the group consisting of the first port, the second port, the third port and the fourth port is connected to the at least one analytical device, preferably via at least one capillary.

Embodiment 44

The analytical system according to any one of the two preceding embodiments, wherein the analytical device is selected from the group consisting of: a sample separation device, preferably a capillary electrophoresis device; a mass spectrometer, preferably a matrix-assisted laser desorption/ ionization time of flight mass spectrometer, more preferably an electrospray ionization mass spectrometer; a capillary isoelectric focusing device; an isotachophoresis device; a chromatograph, preferably a chromatograph selected from the group consisting of a liquid chromatograph and a gas chromatograph, more preferably a high-performance liquid chromatograph; a size exclusion chromatograph; an ion-exchange chromatograph; an affinity chromatograph; a capillary electro chromatograph; a micellar electrokinetic chromatograph; a combination of an ion exchange and a reversed phase liquid chromatrograph; a fraction collector.

Embodiment 45

The analytical system according to any one of the three preceding embodiments, wherein the analytical system comprises at least two analytical devices, wherein at least one first analytical device is connected to the first block and wherein at least one second analytical device is connected to the second block.

Embodiment 46

The analytical system according to the preceding embodiment, wherein the first and second analytical devices are one of identical types or different types of analytical devices.

Embodiment 47

The analytical system according to any one of the two preceding embodiments, wherein the at least one first analytical device comprises at least two first analytical devices connected to different ports of the first block.

Embodiment 48

The analytical system according to any one of the three preceding embodiments, wherein the at least one second analytical device comprises at least two second analytical devices connected to different ports of the second block.

Embodiment 49

A method for sample transfer, the method using the sample transfer device according to any one of the preceding claims referring to a sample transfer device, the method comprising the following steps:
  d) feeding a sample into the second straight channel of the sample transfer device;
  e) transferring at least one part of the sample to the first straight channel of the sample transfer device by linearly moving the slider from the first position to the second position.

Embodiment 50

The method for sample transfer according to the preceding embodiment, wherein the first straight channel and/or the second straight channel are rinsed simultaneously with at least one fluid before performing step a).

Embodiment 51

The method for sample transfer according to any one of the preceding embodiments relating to a method for sample transfer, wherein the sample is injected into the second straight channel, particularly by at least one capillary which is connected to the second port or to the fourth port of the sample transfer device before performing step a).

Embodiment 52

The method for sample transfer according to the preceding embodiment, wherein a capillary electrophoresis device is connected to the second port and to the fourth port and an electrical potential is applied to the second straight channel during performing step a).

Embodiment 53

The method for sample transfer according to any one of the preceding embodiments relating to a method for sample transfer, wherein step b) is performed when a predetermined analyte of the sample is positioned in a slider channel section of the second straight channel which is located on the slider.

Embodiment 54

The method for sample transfer according to the preceding embodiment, wherein a position of the analyte within the second straight channel is determined by using at least one optical technique.

Embodiment 55

The method for sample transfer according to any one of the preceding embodiments relating to a method for sample transfer, wherein the method for sample transfer further comprises the following step:
(f) detecting the analyte, wherein the first port and/or the third port are connected to at least one analytical device.

Embodiment 56

The method for sample transfer according to the preceding embodiment, wherein the analytical device is a mass spectrometer.

Embodiment 57

The method for sample transfer according to any one of the preceding embodiments relating to a method for sample transfer, wherein the sample transfer device further comprises at last two further sliders located between the first block and the second block, wherein the first block comprises at least one seventh port and at least one eight port, wherein the second block comprises at least one ninth port and at least one tenth port, wherein the two further sliders are moved in the first position, wherein in the first position a third straight channel is defined between the seventh port and the ninth port and a fourth straight channel is defined between the eight port and the tenth port.

Embodiment 58

The method for sample transfer according to the preceding embodiment, wherein in the first position, at least one channel selected from the group consisting of: the first straight channel; the second straight channel; the third straight channel; the fourth straight channel, is rinsed with at least fluid selected from the group consisted of: a fluid for rinsing; a derivatization reagent; a substance for stacking; a substance for a dynamic pH junction technique; a fluid for complexation; a fluid for digestion, particularly a fluid for proteolytic digestion; a fluid for transient isochophoresis; a fluid for derivatization.

Embodiment 59

The method for sample transfer according to any one of the two preceding embodiments, wherein in the second position the slider and the two further sliders are linearly moved such that the first straight channel is formed.

Embodiment 60

The method for sample transfer according to any one of the preceding embodiments relating to a method for sample transfer, wherein the slider is moved from the first position to the second position or vice versa in less than 5 s, preferably in less than 1 s, more preferably in less than 500 ms.

Embodiment 61

A method for manufacturing the sample transfer device, according to any one of the preceding embodiments referring to a sample transfer device, the method comprising the following steps:
IV. providing at least one substrate;
V. generating the at least two straight channels on a surface of the substrate;
VI. cutting the substrate in order to form the at least one first block, the at least one slider and the at least one second block, wherein, during the cutting, at least two straight separating lines are generated.

Embodiment 62

The method for manufacturing a sample transfer device according to the preceding embodiment, wherein the substrate is made from at least one material selected from the group consisting of: glass, particularly silica glass; a polymer, particularly at least one polymer selected from the group consisting of: polytetrafluoroethylene, polyetheretherketone, cyclic olefin copolymers, polyacrylates; a ceramic material; a semiconductor material, preferably a semiconductor wafer.

Embodiment 63

The method for manufacturing a sample transfer device according to any one of the preceding embodiments relating to a method for manufacturing a sample transfer device, wherein the at least two straight channels are generated by using at least one microstructure technology, preferably by one or more of etching, lithography, laser ablation, embossing.

Embodiment 64

The method for manufacturing a sample transfer device according to the preceding embodiment, wherein the two straight channels are generated by etching, particularly by utilizing hydrofluoric acid.

Embodiment 65

The method for manufacturing a sample transfer device according to any one of the preceding embodiments relating to a method for manufacturing a sample transfer device, wherein the two straight channels are coated with at least one coating material.

Embodiment 66

The method for manufacturing a sample transfer device according to the preceding embodiment, wherein the coating material comprises at least one of a surfactant or a material configured for at least partially preventing an adhesion of proteins to a surface of the channels.

Embodiment 67

The method for manufacturing a sample transfer device according to any one of the preceding embodiments relating to a method for manufacturing a sample transfer device, wherein the channels are open channels, preferably grooves.

Embodiment 68

The method for manufacturing a sample transfer device according to any one of the preceding embodiments relating to a method for manufacturing a sample transfer device, wherein the method further comprises at least partially covering the channels with at least one cover element.

Embodiment 69

The method for manufacturing a sample transfer device according to the preceding embodiment, wherein the cover element comprises at least one of a cover plate, a wafer or a glass plate.

Embodiment 70

The method for manufacturing a sample transfer device according to any one of the two preceding embodiments, wherein the cover element is bonded onto one or more of the first block, the second block or the slider.

Embodiment 71

The method for manufacturing a sample transfer device according to the preceding embodiment, wherein the bonding is conducted by at least one thermal treatment.

Embodiment 72

The method for manufacturing a sample transfer device according to any one of the preceding embodiments relating to a method for manufacturing a sample transfer device, wherein the method further comprises connecting ends of the two straight channels to capillaries.

Embodiment 73

The method for manufacturing a sample transfer device according to the preceding embodiment, wherein the ends of the two straight channels are connected to the capillaries by adhesive force.

Embodiment 74

A use of a sample transfer device according to any one of the preceding claims relating to a sample transfer device for at least one purpose of use selected from the group consisting of: multi-dimensional separation, specifically comprehensive two-dimensional separation, of complex samples, samples of biological origin, of extracts of natural materials, preferably of protein samples or peptide samples, preferably of herbs, plants, organisms/tissues, pharmaceuticals, preferably pharmaceuticals to characterize active pharmaceutical ingredients, excipients and/or impurities; mass spectroscopy detection of protein charge variants; mass spectroscopy detection of proteoforms; interference free connection of electro driven separation techniques which use non volatile substances to a mass spectrometer, separation of analytes and mass spectroscopy interference substances.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIGS. 2A to 2B show an exemplary embodiment of a sample transfer device (FIG. 2A) and a slide view of a slider of the sample transfer device (FIG. 2B);

FIGS. 3A to 3B show an exemplary embodiment of a sample transfer device (FIG. 3A) and a slide view of a slider of the sample transfer device (FIG. 3B);

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1A:
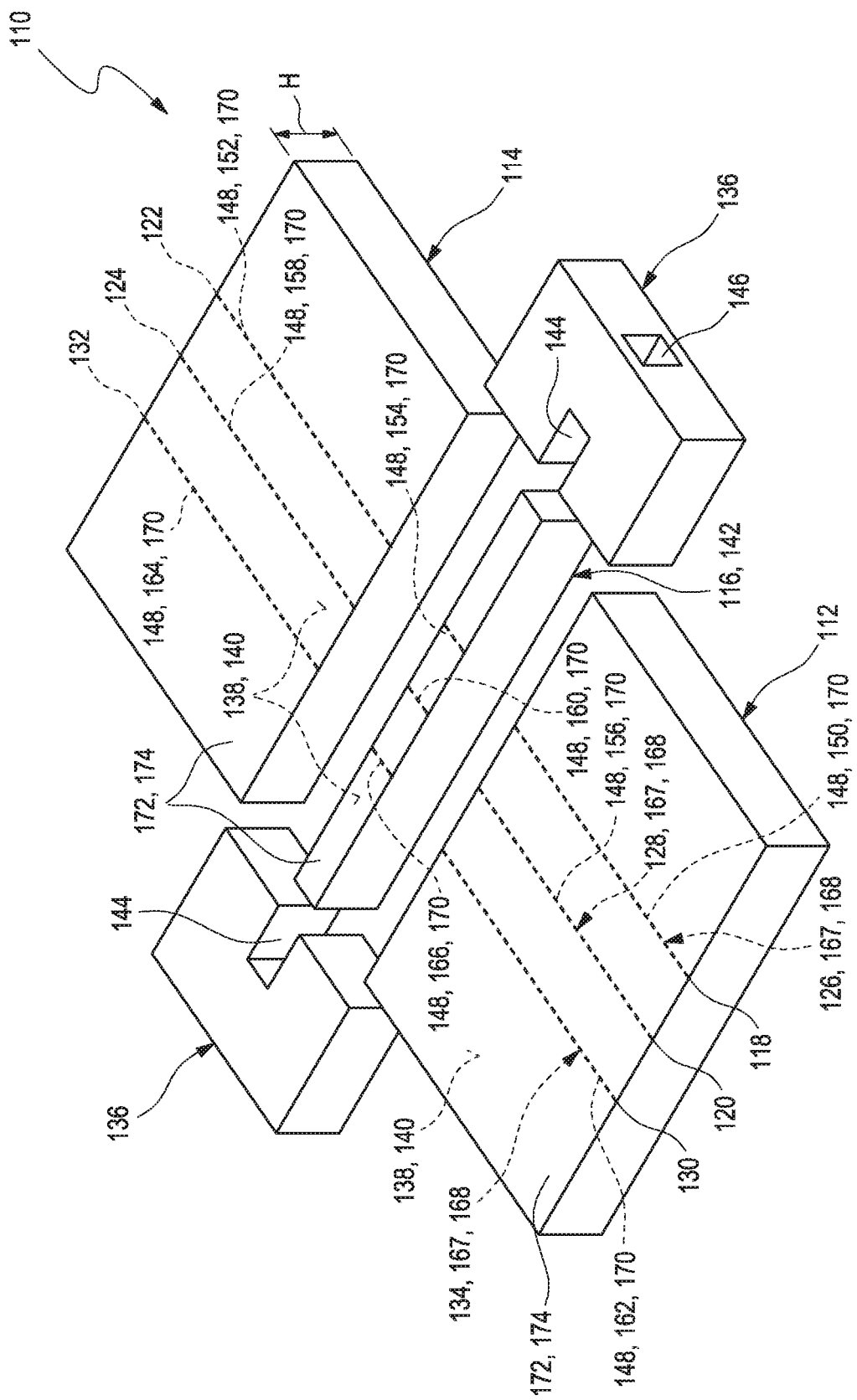
FIGS. 1A to 1C show an exemplary embodiment of a sample transfer device in different perspective views.
Figure 1:
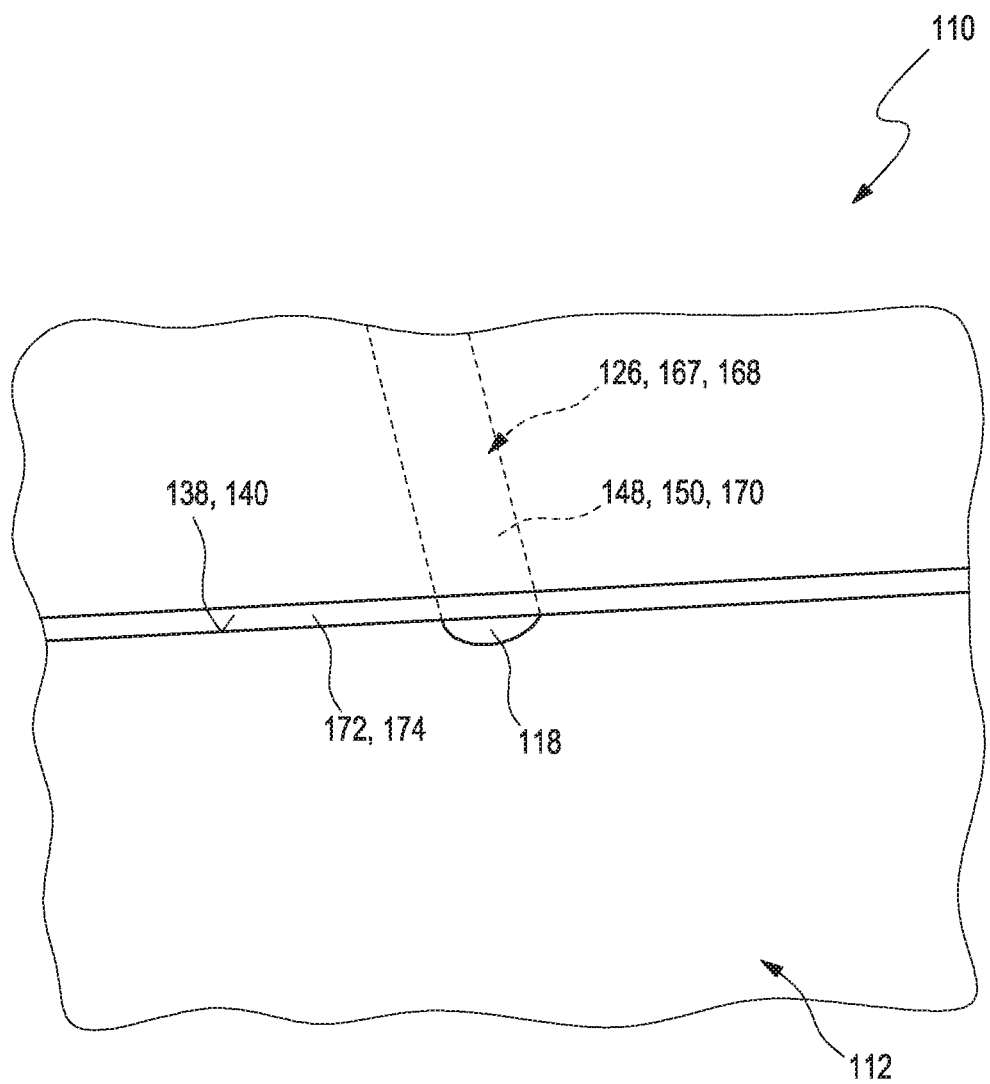
Figure 4:
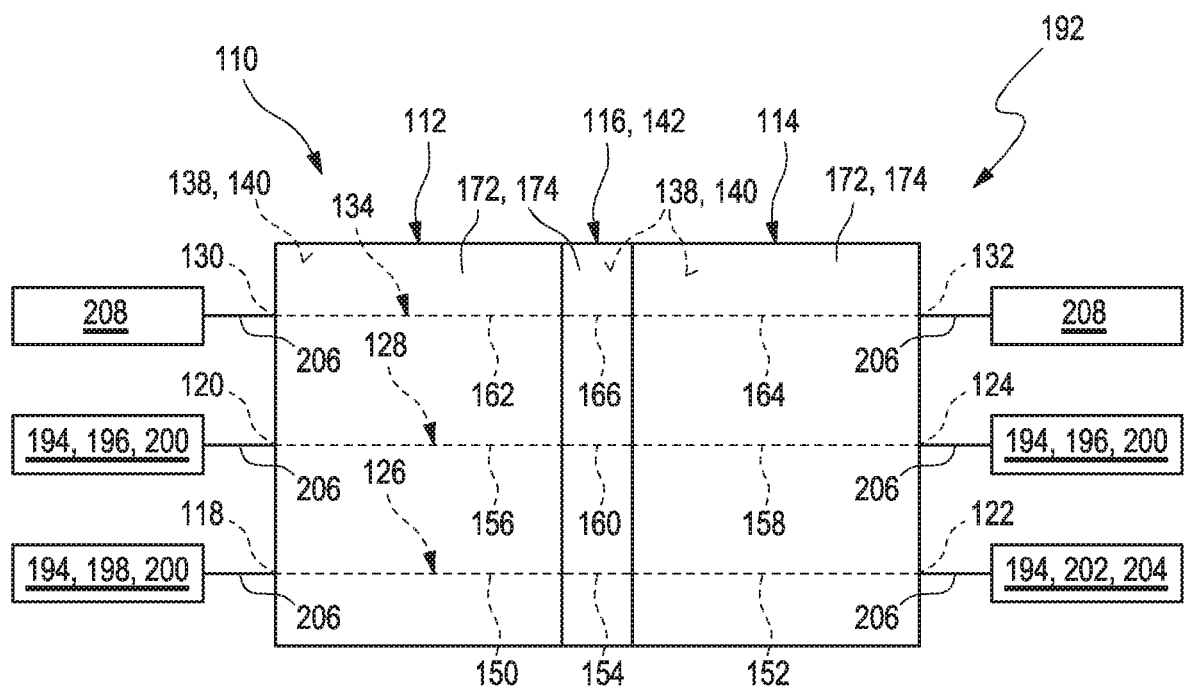
FIGS. 4A to 4E show an exemplary embodiment of a method for sample transfer, wherein an analytical system comprising a sample transfer device is depicted in a top view.
Figure 4:
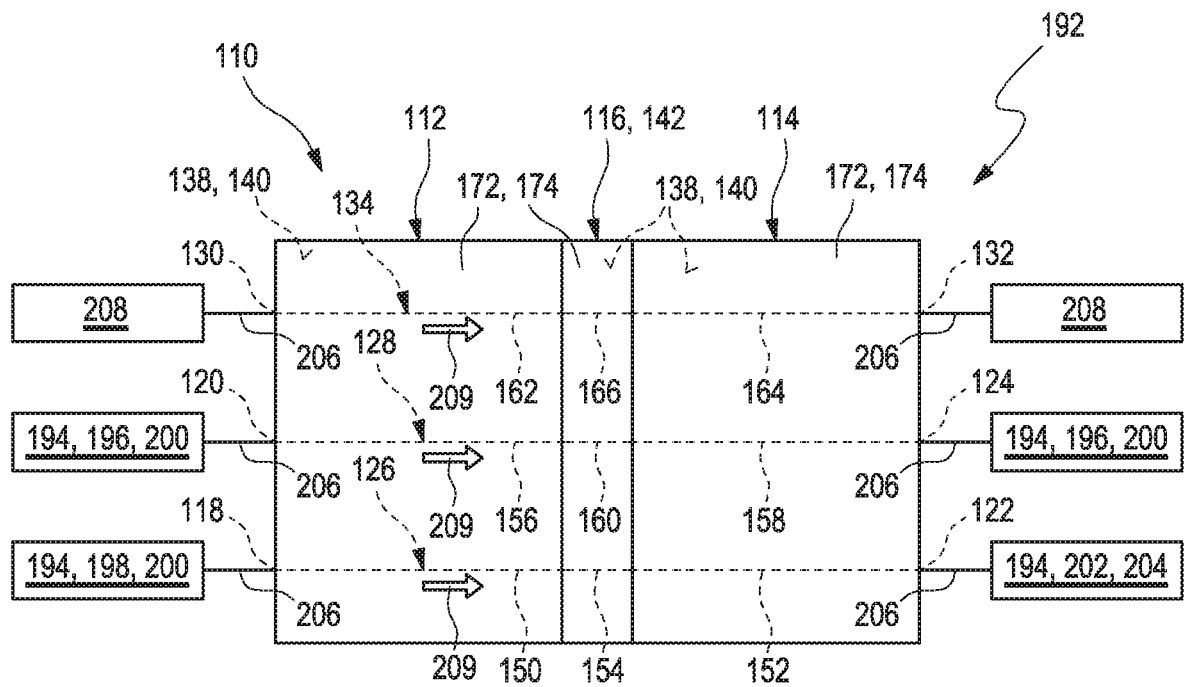
Figure 4:
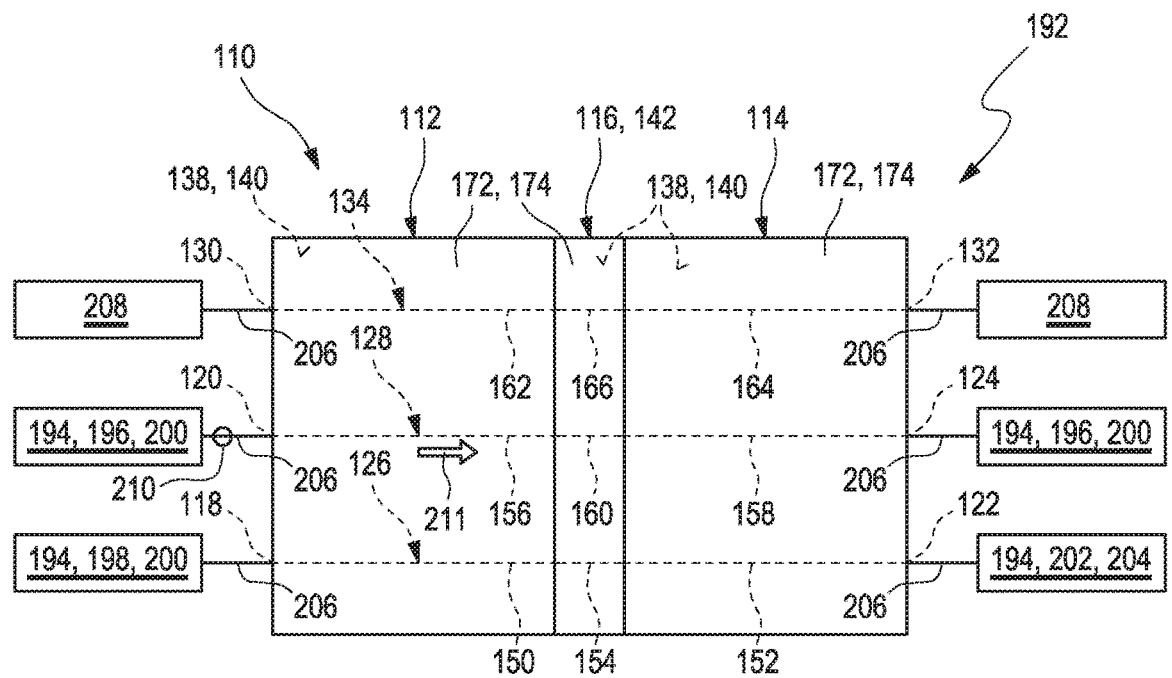
Figure 4:
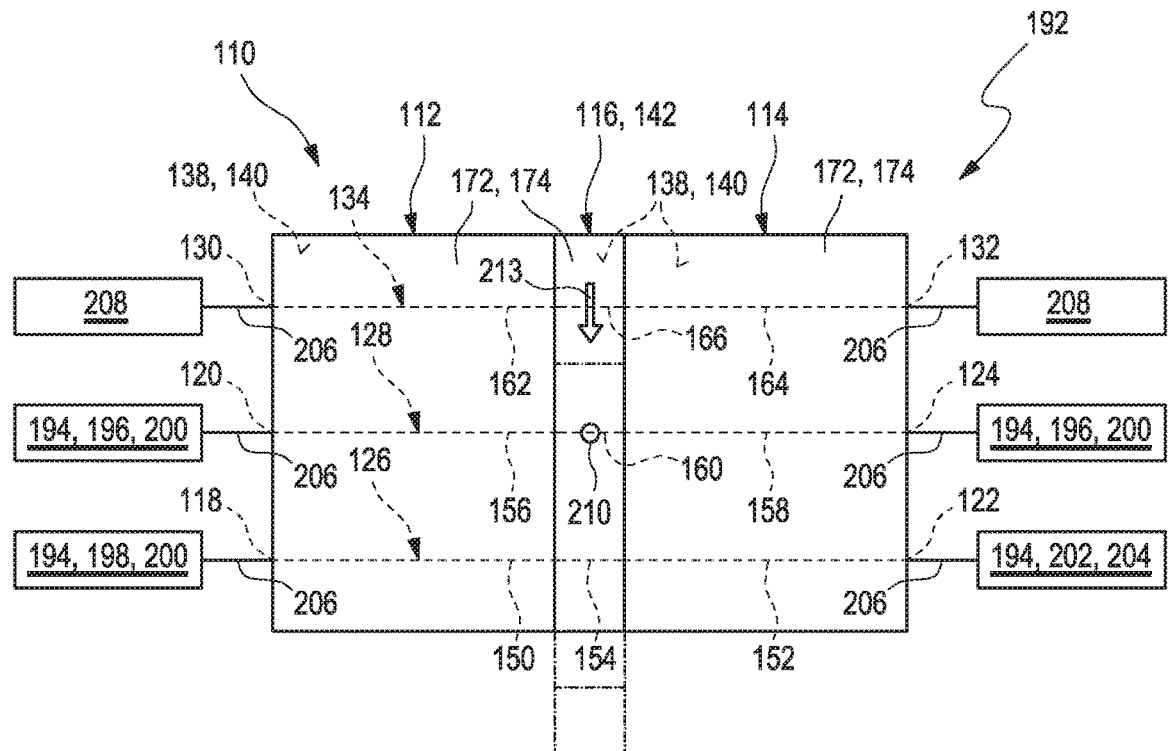
Figure 4:
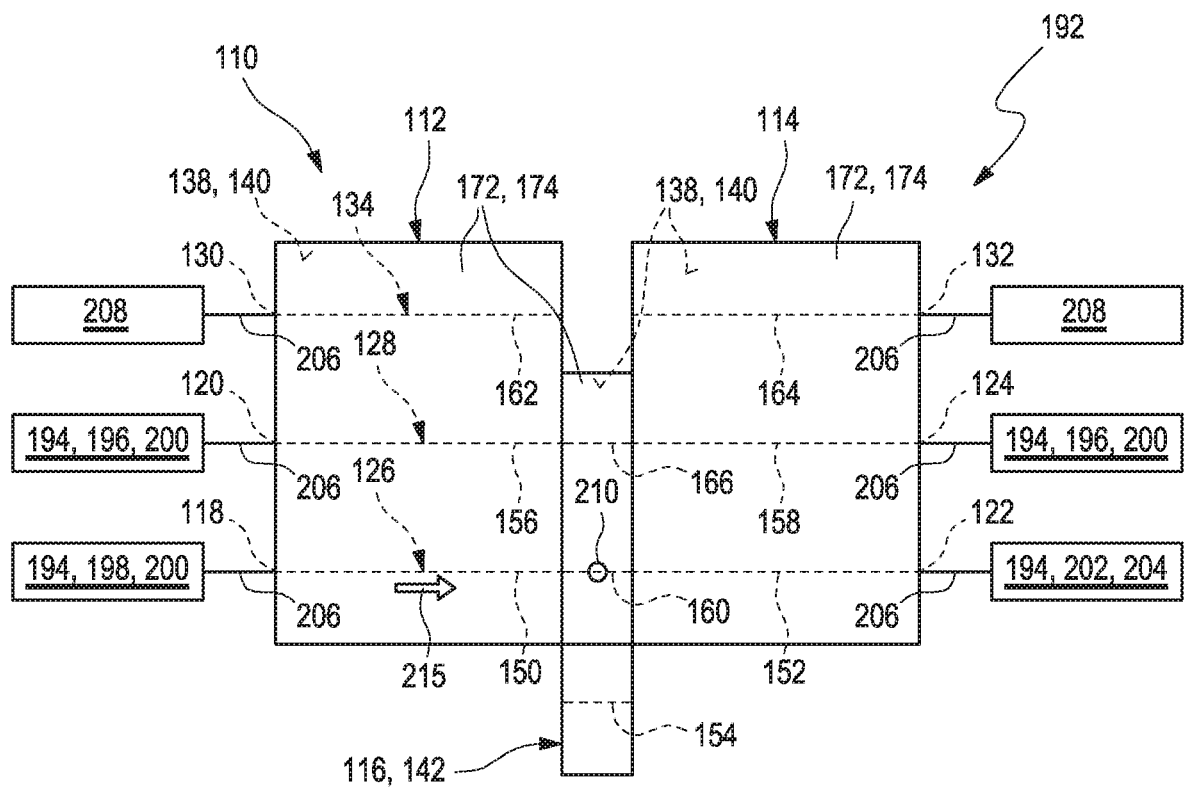

FIGS. 1A to 1C show an exemplary embodiment of a sample transfer device 110 in different perspective views. Wherein in FIG. 1A the sample transfer device 110 is shown as a whole, in FIGS. 1B and 1C different enlarged views of the sample transfer device 110 are shown.

The sample transfer device 110 comprises at least one first block 112, at least one second block 114 and at least one slider 116. The first block 112 comprises at least one first port 118 and at least one second port 120. Further, the second block 114 comprises at least one third port 122 and at least one fourth port 124. The slider 116 is located between the first block 112 and the second block 114. The slider 116 is configured to slide from a first position to a second position and vice versa. Both in the first position and in the second position, a first straight channel 126 is formed between the first port 118 and the third port 122 and a second straight channel 128 is formed between the second port 120 and the fourth port 124. Further, the first block 112 may comprise at least one fifth port 130 and the second block 114 may comprise at least one sixth port 132. In the first position, a further straight channel 134 may be formed between the fifth port 130 and the sixth port 132. Further, the sample transfer device 110 may comprise at least one stopper 136 configured to limit a movement of the slider 116 in linear direction.

The first block 112 and/or the second block 114 may be made of glass, a ceramic material, a polymer or a semi-conductor material. Still, other materials are feasible. Specifically, the first block 112 and/or the second block 114 may have a cubic shape. The first block 112 and/or the second block 114 may further comprise at least one flat surface 138. Specifically, a top surface 140 of the first block 112 and/or of the second block 114 may be a flat surface 138 which may be configured to provide parts of the first straight channel 126 and the second straight channel 128 as will further be described below. The first block 112 and the second block 114 may have an identical shape. Specifically, the first block 112 and the second block 114 may have an identical height. Further, the first block 112 and the second block 114 may be oriented parallel to each other such that the first port 118 of the first block 112 and the third port 122 of the second block 114 as well as the second port 120 of the first block 112 and the fourth port 124 of the second block 114 may be oriented in one straight line, respectively.

The slider 116 may be made of a solid material such as glass, a ceramic material, a polymer or a semi-conductor material. Specifically, the slider 114 may be made of the same material as the first block 112 and/or the second block 114. The slider 116 may have a cubic shape. Specifically, the first block 112, the second block 114 and the slider 116 may have an identical high. The slider 116 may comprise at least one flat surface 138. The flat surface 138 may be configured to provide at least parts of the first straight channel 126 and of the second straight channel 128 as will further be described below.

Specifically, the slider 116 may be a linear slider 142 configured to perform a linear sliding movement from the first position to the second position and vice versa. Therefore, the stopper 136 may be configured to limit a movement of the slider 116 in a linear direction. The stopper 136 may be made of at least one solid material. The stopper 136 may comprise at least one receptacle 144, configured to receive the slider 116 at least partially. A geometry of the receptacle 144 may correspond to the geometry of the slider 116 or at least of parts of the slider 116. The position of the stopper 136 may be adjustable, particularly by micrometer screws and/or clamps (not shown). The position of the stopper 136 may define one or both of the first position or the second position of the slider 116. The sample transfer device 110 may further comprise at least one actuator (not shown) configured to move the slider 116 in a linear direction. Therefore, the stopper 136 may comprise at least one outlet 146 so that the slider 116 may be connectable to the actuator.

The first block 112, the second block 114 and/or the slider 116 may each comprise straight channel sections 148. The first straight channel 126 may specifically be formed by a first straight channel section 150, located on the first block 112, a second straight channel section 152 located on the second block 114 and a first slider channel section 154 located on the slider 116. The second straight channel 128 may be formed by a third straight channel section 156 located on the first block 112, a fourth straight channel section 158 located on the second block 114 and by a second slider channel section 160 located on the slider 116. The further straight channel 134 may be formed by a fifth straight channel section 162 located on the first block 112, a sixth straight channel section 164 located on the second block 114 and a third slider channel section 166 located on the slider 116. However, the straight channel sections 148 may be exchangeable, such that the first straight channel 126 and/or the second straight channel 128 and/or the further straight channel 134 may be formable with different combinations of channel sections 148. In FIGS. 1A and 1B, the slider 116 may be in the first position. However, as described above, the slider 116 is configured to slide from the first position to the second position and vice versa. In the second position (not shown), the first straight channel 126 may be formed by the first straight channel section 150 located on the first block 112, the straight channel section 152 located on the second block 114 and the second slider channel section 160 located on the slider 116. Further, in the second position, the second straight channel 128 may be formed by the third straight channel section 156 located on the first block 112, the fourth straight channel section 158 located on the second block 114 and the third slider channel section 166 located on the slider 116.

The straight channel sections 148 may be oriented essentially parallel. Further, the first straight channel and the second straight channel, as well as the second straight channel and the further straight channel, may be separated by a distance of 5 mm to 50 mm. However, even higher distances between the first straight channel 126 and the second straight channel 128, as well as between the second straight channel 128 and the further straight channel 134 may be possible and there may be no limitations.

The first straight channel 126 and/or the second straight channel 128 and/or the further straight channel 134 may be microfluidic channels 167 with dimensions on a submillimeter scale. As specifically depicted in FIG. 1C, the first straight channel 126 and/or the second straight channel 128 and/or the further straight channel 134 may at least partially have a round cross-section. Specifically, the cross-section may have a diameter of 5 µm to 500 µm, preferably of 20 µm to 100 µm. Still, other dimensions are feasible.

The straight channel sections 148 may be open channels 168. Specifically, the open channels 168 may be formed by a groove 170 into the top surface 140 of the first block 112, the second block 114 and/or the slider 116. As depicted in FIG. 1C, the open channels 168 may be at least partially covered by at least one cover element 172. Cover element 172 may specifically be made of an optically transparent material such as glass. However, other materials are also feasible. The cover element 172 may be a common cover element 174 for the first block 112, the second block 114 and the slider 116.

FIG. 2A shows an exemplary embodiment of a sample transfer device 110 and FIG. 2B shows a side view of a slider 116 of the sample transfer device 110. The sample transfer device 110 may, at least in large part, correspond to the sample transfer device 110 as illustrated in FIGS. 1A to 1C. Consequently, reference can be made to the description of FIGS. 1A to 1C above.

Further, the slider 116 may comprise at least one cavity 176, configured to receive excessive fluid. The cavity 176 may be formed by a void volume 178. Specifically, the cavity 176 may be located on at least one lateral face 180 of the slider 116 perpendicular to a direction of extension 182 of the sample transfer device 110. Specifically, the slider may comprise a first slider front face 184 facing the first block 112. The slider 116 may further comprise a second slider front face 186 facing the second block 114. The first slider front face 184 may slide on a first front face 188 of the first block and the second slider front face 186 may slide on a second front face 190 on the second block 114. The cavity 176 may specifically be located on one or both of the first slider front face 184 or the second slider front face 186.

The cavity 176 may exemplarily have a rectangular cross-section. The cavity 176 may specifically have dimensions in the submillimeter range.

FIG. 3A shows an exemplary embodiment of a sample transfer device 110 and FIG. 3B shows a side view of slider 116 of the sample transfer device 110. The sample transfer device 110 may, at least in large part, correspond to the sample transfer device 110 as illustrated in FIGS. 2A and 2B. Consequently, reference may be made to the description of FIGS. 2A and 2B above.

The slider 116 as illustrated in FIGS. 3A and 3B may also comprise the at least one cavity 176 as depicted in FIGS. 2A and 2B. However, the cavity 176 of the slider 116 as illustrated in FIGS. 3A and 3B may fully penetrate the lateral face 180 of the slider 176.

FIGS. 4A to 4E show an exemplary embodiment of a method for sample transfer. Thereby, an analytical device 192 is illustrated in a top view. The analytical device 192 comprises the sample transfer device 110. The sample transfer device 110 may correspond in large part to the sample transfer device 110 as illustrated in FIGS. 1A to 3B. Thus, reference may be made to the descriptions of the FIGS. 1A to 3B above.

The analytical system 192 may further comprise at least one analytical device 194 fluidically connected to the sample transfer device 110. Analytical device 194 may be handled independently from the sample transfer device 110. Exemplarily, the analytical system 192 may comprise at least three analytical devices 194. At least one first analytical device 196 may be connected to the first block 112 and the second block 114. Specifically, the first analytical device 196 may be connected to the second port 120 of the first block 112 and to the fourth port 124 of the second block 114. Further, at least one second analytical device 198 may be connected to the first block 112, specifically to the first port 118 of the first block 112. The first analytical device 196 and the second analytical device 198 may be identical types of analytical devices 194. Exemplarily, the first analytical device 196 and the second analytical device 198 may be or may comprise at least one capillary electrophoresis device 200. The analytical system 192 may further comprise a third analytical device 202. The third analytical device may specifically be connected to the second block, specifically to the third port 122 of the first block 112. Exemplarily, the third analytical device 202 may be a mass spectrometer 204. The analytical devices 194, specifically the first analytical device 196, the second analytical device 198 and/or the third analytical device 202 may respectively be connected to the sample transfer device 110 via at least one capillary 206. Moreover, the further straight channel 134, specifically the fifth port 130 and the sixth port 132 may be connected to at least one pump 208 via the capillaries 206.

In a first step of the method for sample transfer, as depicted in FIG. 4B via first arrows 209, the first straight channel 126 and/or the second straight channel 128 and/or the further straight channel 134 may be rinsed simultaneously with at least one fluid. Thereby, the slider 116 may be in the first position such that the first straight channel 126 may be formed by the first slider channel section 154 and the second straight channel 128 may be formed by the second slider channel section 160.

In a next step, as depicted in FIG. 4C via a second arrow 211, a sample may be injected into the second straight channel 128, particularly by at least one capillary 206 which is connected to the second port 120 of the sample transfer device 110. Specifically, the sample may comprise at least one analyte 210 as schematically illustrated as a dot in FIG. 4C. An electrical potential may be applied to the second straight channel 128 by the capillary electrophoresis device 200 during feeding the sample into the second straight channel 128 of the sample transfer device.

In a next step, as depicted in FIG. 4D, at least one part of the sample may be transferred to the first straight channel 126 of the sample transfer device 110 by linear moving of the slider 116 from the first position to the second position as depicted via a third arrow 213. Thereby, the first straight channel 126 may be formed by the second slider channel section 160. Specifically, this step may be performed when the predetermined analyte 210 of the sample is positioned on the second slider channel section 160. The position of the analyte 210 within the second straight channel 128 may be determined by using at least one optical technique (not shown).

In a next step, as depicted in FIG. 4E, a separation of the analyte 210 may be conducted by applying an electrical potential through the first straight channel 126 by the second analytical device 198, specifically by the capillary electrophoresis device 200. The analyte 210 may be moved into a direction of the mass spectrometer 204. This is illustrated by the fourth arrow 215. The method for sample transfer may further comprise detecting the analyte 210, specifically by the mass spectrometer 204. In a next step (not shown), the slider 116 may be moved back in the first position and the method may be conducted repeatedly.

Figure 5A:
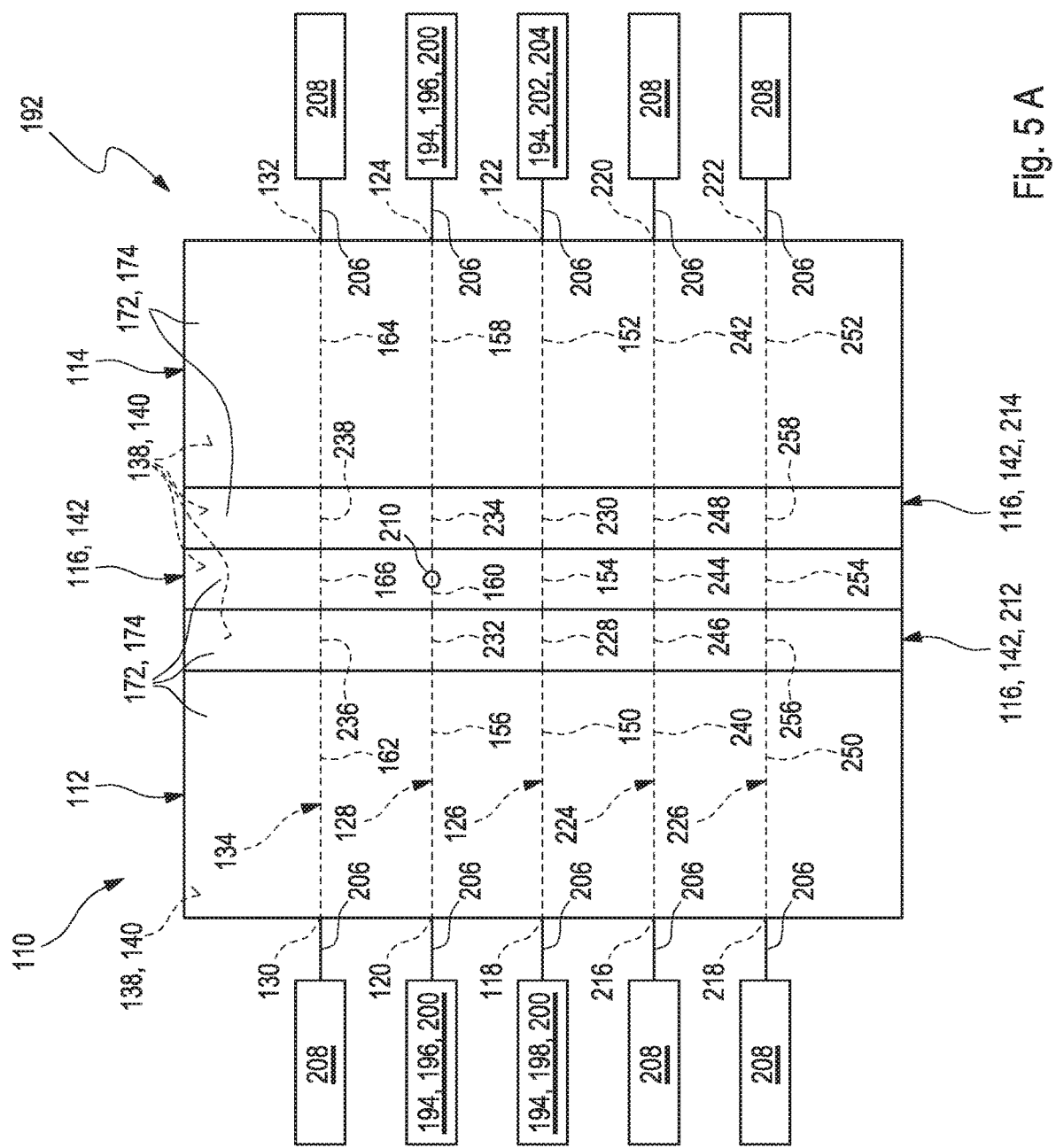
FIGS. 5B to 5B show an exemplary embodiment of a method for sample transfer, wherein an analytical system is depicted in a top view.
Figure 5:
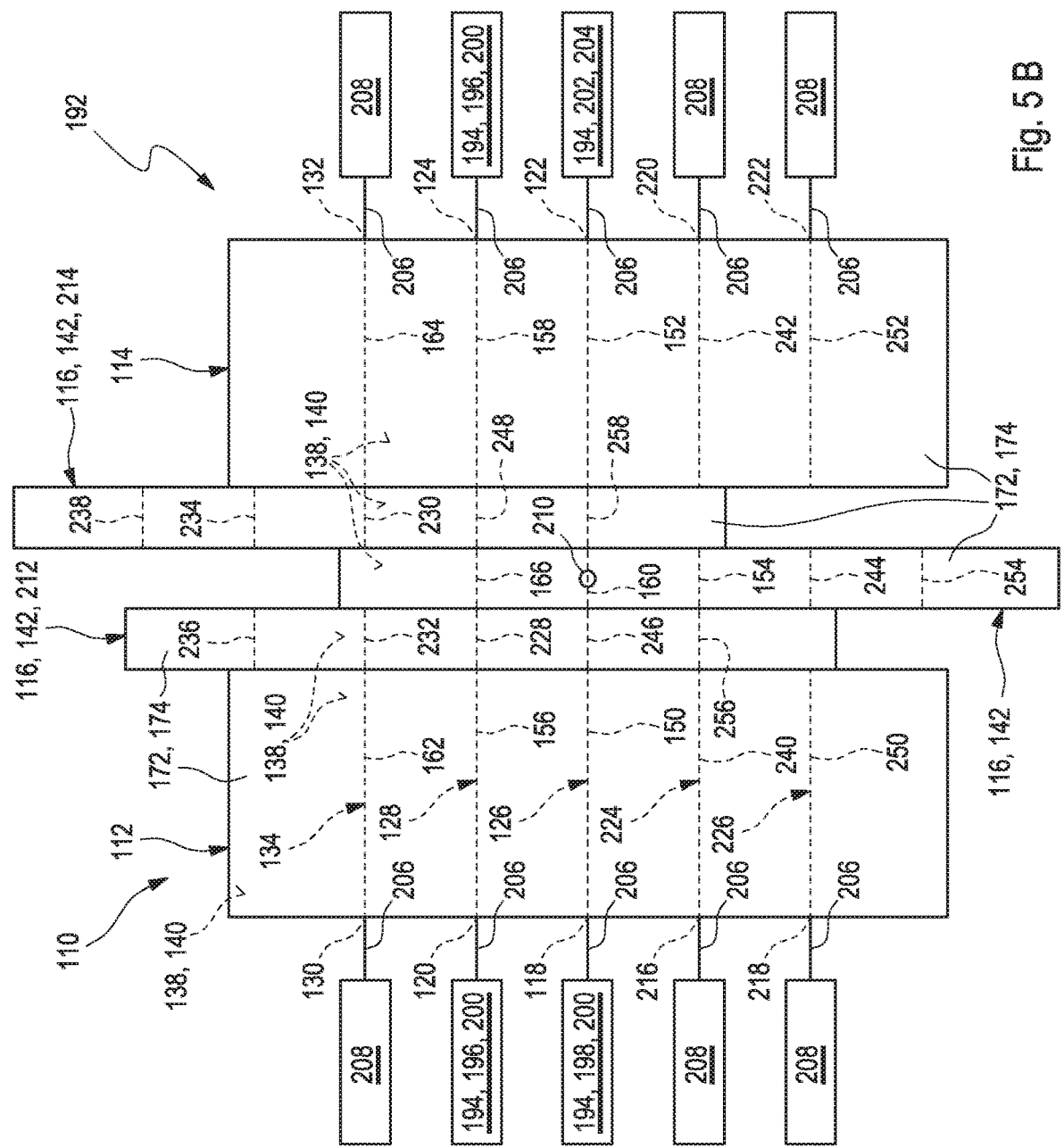

FIGS. 5A to 5B show an exemplary embodiment of a method for sample transfer. Thereby, the analytical system 192 is depicted in a top view. The analytical system 192 comprises the sample transfer device 110 and several of the analytical devices 192.

The sample transfer device 110 corresponds, at least partially, to the sample transfer device 110 as described in FIGS. 1A to 4E. Thus, reference may be made to the descriptions of FIGS. 1A to 4E above. Further, the sample transfer device 110 may comprise three sliders 116. Specifically, the sample transfer device 110 may comprise a first further slider 212 and a second further slider 214. The first further slider 212, the second further slider 214 and the slider 116 may be oriented in a parallel fashion. The first further slider 212, the second further slider 214 and the slider 116 may be located adjacent to each other in between the first block 112 and the second block 114.

The first block 112 may comprise at least one seventh port 216 and at least one eight port 218. The second block 114 may comprise at least one ninth port 220 and at least one tenth port 222. In the first position, as depicted in FIG. 5A, a third straight channel 224 may be defined between the seventh port 216 and the ninth port 220 and a fourth straight channel 226 may be defined between the eighth port 218 and the tenth port 222. The third straight channel 224 and/or the fourth straight channel 226 may exemplarily be configured to provide at least one fluid for rinsing, digestion, complexation, stacking, dynamic pH junction, transient isotachophoresis or derivatization. Still, other embodiments are feasible. Thus, further pumps 208 may be connected to the seventh port 216 and/or to the eight port 218.

In the first position, the first straight channel 126 may comprise the first straight channel section 150, the second straight channel section 152, the first slider channel section 154 as well as the first further slider channel section 228 and the second further slider channel section 230. Additionally, the second straight channel 128 may comprise the third straight channel section 156, the fourth straight channel section 158, the second slider channel section 160 as well as the third further slider channel section 232 and the fourth further slider channel section 234. The further straight channel 134 may comprise the fifth straight channel section 162, the sixth straight channel section 164, the third slider channel section 166 as well as the fifth further slider channel section 236 and the second further slider channel section 238.

The third straight channel 224 may comprise a seventh straight channel section 240 located on the first block 112 and a eight straight channel section 242 located on the second block 114. Further, the third straight channel 224 may comprise a fourth slider channel section 244 located on the slider 116, a seventh further slider channel section 246 located on the first further slider 212 and an eighth further slider channel section 248 located on the second further slider 214. The fourth straight channel 226 may comprise a ninth straight channel section 250 located on the first block 112 and a tenth channel section 252 located on the second block 114. Further, the fourth straight channel 226 may comprise a fifth slider channel section 254 located on the slider 116, a ninth further slider channel section 256 located on the first further slider 212 and a tenth further slider channel section 258 located on the second further slider 214.

The method for sample transfer may be conducted analogous to the method described within the FIGS. 4A to 4E including feeding a sample into the second straight channel 128 of the sample transfer device 110 until the predetermined analyte 210 of the sample is positioned in the second straight channel slider section 160, as illustrated in FIG. 5A. In a further step, at least one part of the sample, specifically the analyte 210, may be transferred to the first straight channel 126 of the sample transfer device 110 by linearly moving the slider 116, the first further slider 212 and the second further slider 214 such that, in the second position, the first straight channel 126 may be formed by different channel sections of the sliders 116. Thus, the first straight channel 126 may be formed by the first straight channel section 150, the seventh further channel section 246, the second slider channel section 160, the tenth further channel section 258 and the second straight channel section 152. The second straight channel 128 may be formed by the third straight channel section, 156, first straight channel section 228, third slider channel section 166, eight further channel section 248, fourth straight channel section 158.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 110 sample transfer device
112 first block
114 second block
116 slider
118 first port
120 second port
122 third port
124 fourth port
126 first straight channel
128 second straight channel
130 fifth port
132 sixth port
134 further straight channel
136 stopper
138 flat surface
140 top surface
142 linear slider
144 receptacle
146 outlet
148 straight channel section
150 first straight channel section
152 second straight channel section
154 first slider channel section
156 third straight channel section
158 fourth straight channel section
160 second slider channel section
162 fifth straight channel section
164 sixth straight channel section
166 third slider channel section
167 microfluidic channel
168 open channel
170 groove
172 cover element
174 common cover element
176 cavity
178 void volume
180 lateral face
182 direction of extension
184 first slider front face
186 second slider front face
188 first front face
190 second front face
192 analytical system
194 analytical device
196 first analytical device
198 second analytical device
200 capillary electrophoresis device
202 third analytical device
204 mass spectrometer
206 capillary
208 pump
209 first arrow
210 analyte
211 second arrow
212 first further slider
213 third arrow
214 second further slider
215 fourth arrow
216 seventh port
218 eighth port
220 ninth port
222 tenth port
224 third straight channel
226 fourth straight channel
228 first further slider channel section
230 second further slider channel section
232 third further slider channel section
234 fourth further slider channel section
236 fifth further slider channel section
238 sixth further slider channel section
240 seventh straight channel section
242 eighth straight channel section
244 fourth slider channel section
246 seventh further slider channel section
248 eighth further slider channel section
250 ninth straight channel section
252 tenth straight channel section
254 fifth slider channel section
256 ninth further slider channel section
258 tenth further slider channel section

What is claimed is:

1. A sample transfer device, comprising:
   a first block comprising a first port and a second port;
   a second block comprising a third port and a fourth port;
   a slider located between the first block and the second block, wherein the slider is configured to slide from a first position to a second position and vice versa;
   at least one stopper configured to limit movement of the slider in linear direction to thereby align the channels and ports in at least one of the first and second positions;
   wherein both in the first position and in the second position a first straight channel is formed between the first port and the third port and a second straight channel is formed between the second port and the fourth port.

2. The sample transfer device according to claim 1, wherein the slider is a linear slider configured to perform a linear sliding movement from the first position to the second position and vice versa.

3. The sample transfer device according to claim 1, wherein the first block, the second block and the slider each comprise straight channel sections.

4. The sample transfer device according to claim 3, wherein the channel sections all are formed as grooves in surfaces of the first block, the second block and the slider, respectively, wherein the grooves are at least partially covered by at least one cover element.

5. The sample transfer device according to claim 1, wherein the at least one stopper is configured to limit movement of the slider in linear direction to thereby align the channels and ports in both of the first and second positions.

6. The sample transfer device according to claim 1, wherein the sample transfer device further comprises at least one actuator configured to move the slider in a linear direction.

7. The sample transfer device according to claim 1, wherein the slider comprises at least one cavity configured to receive excessive fluid.

8. The sample transfer device according to claim 7, wherein the cavity is located between the first straight channel and the second straight channel while the slider is in the first position.

9. The sample transfer device according to claim 7, wherein the cavity is located on at least one lateral face of the slider perpendicular to a direction of extension of the sample transfer device.

10. An analytical system for analyzing a sample, comprising:
    the sample transfer device according to claim 1; and
    at least one analytical device fluidically connected to the sample transfer device.

11. A method for sample transfer using the sample transfer device according to claim 1, the method comprising the following steps:
    a) feeding a sample into the second straight channel of the sample transfer device; and
    b) transferring at least one part of the sample to the first straight channel of the sample transfer device by linearly moving the slider from the first position to the second position.

12. The method for sample transfer according to claim 11, wherein step b) is performed when a predetermined analyte of the sample is positioned in a second slider channel section of the second straight channel which is located on the slider.

13. The method for sample transfer according to claim 11, wherein the method for sample transfer further comprises the following step:
    c) detecting the analyte, wherein the first port and/or the third port are connected to at least one analytical device.

14. A method for manufacturing the sample transfer device according to claim 1, the method comprising the following steps:
    providing at least one substrate;
    generating the first straight channel and the least one second straight channel on a surface of the substrate;
    cutting the substrate in order to form the first block, the slider and the second block, wherein, during the cutting, at least two straight separating lines are generated.

* * * * *

UNITED STATES PATENT AND TRADEMARK OFFICE
CERTIFICATE OF CORRECTION

PATENT NO. : 10,888,860 B2
APPLICATION NO. : 16/123227
DATED : January 12, 2021
INVENTOR(S) : Meixner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 158 days.

Signed and Sealed this
Fourteenth Day of February, 2023

Katherine Kelly Vidal
*Director of the United States Patent and Trademark Office*